(12) United States Patent
Hemmati et al.

(10) Patent No.: US 10,374,696 B2
(45) Date of Patent: Aug. 6, 2019

(54) BIDIRECTIONAL SATELLITE COMMUNICATIONS

(71) Applicant: Facebook, Inc., Menlo Park, CA (US)

(72) Inventors: Hamid Hemmati, Encino, CA (US); Abhishek Tiwari, Woodland Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 13 days.

(21) Appl. No.: 15/857,605

(22) Filed: Dec. 28, 2017

(65) Prior Publication Data

US 2018/0191428 A1 Jul. 5, 2018

Related U.S. Application Data

(60) Provisional application No. 62/440,238, filed on Dec. 29, 2016.

(51) Int. Cl.
*H04B 7/19* (2006.01)
*H04B 7/185* (2006.01)
(Continued)

(52) U.S. Cl.
CPC .......... *H04B 7/19* (2013.01); *H04B 7/18513* (2013.01); *H04B 10/1125* (2013.01); *H04B 7/195* (2013.01); *H04B 10/29* (2013.01)

(58) Field of Classification Search
CPC ...... H04B 10/40; H04B 10/50; H04B 7/0617; H04B 10/25752; H04B 10/29; H04B 10/1125; H04B 7/19; H04B 7/195
See application file for complete search history.

(56) References Cited

U.S. PATENT DOCUMENTS 9,252,869 B2  2/2016 Gayrard
2005/0090198 A1  4/2005 Christopher
(Continued)

FOREIGN PATENT DOCUMENTS

WO  WO0014902 A2  3/2000

OTHER PUBLICATIONS

International Search Report and Written Opinion for International Application No. PCT/US2017/068898, dated Apr. 18, 2018.
(Continued)

*Primary Examiner* — Keith Ferguson
(74) *Attorney, Agent, or Firm* — Baker Botts L.L.P.

(57) ABSTRACT

Particular embodiments may provide a transceiver in geosynchronous orbit. The transceiver may include a plurality of forward channel receivers. At least one of the forward channel receivers may receive (1) a forward channel laser communication beam transmitted from a ground station and (2) an E-band frequency having a bandwidth of 81-86 GHz. The transceiver may also include a plurality of forward channel transmitters having different frequencies. The forward channel transmitters may transmit user beams to endpoint devices, wherein the user beams are derived from the forward channel laser and MMW communication beams. The transceiver may also include a plurality of return channel receivers, wherein the return channel receivers receive user beams from the endpoint devices. The transceiver may also include at least one return channel transmitter, wherein the return channel transmitter transmits a return channel laser communication beam to a ground station.

20 Claims, 26 Drawing Sheets

(51) Int. Cl.
  *H04B 10/112* (2013.01)
  *H04B 7/195* (2006.01)
  *H04B 10/29* (2013.01)

(56) References Cited

U.S. PATENT DOCUMENTS

| | | | |
|---|---|---|---|
| 2008/0044187 A1* | 2/2008 | Krill | H04B 10/118 398/121 |
| 2009/0289839 A1 | 11/2009 | McDaniel | |
| 2010/0184427 A1 | 7/2010 | Zheng | |
| 2015/0029932 A1 | 1/2015 | Slemp | |
| 2015/0071645 A1 | 3/2015 | Coleman | |
| 2016/0277990 A1 | 9/2016 | Chan | |
| 2016/0285541 A1 | 9/2016 | Liu | |

OTHER PUBLICATIONS

EESR received from EPO for EP17211123.9-1219, dated May 23, 2018.

Lewark, et al., "Link budget analysis for future E-band gigabit satellite communication links (71-76 and 81-84 Ghz)", CEAS Space J., (2013) 4:41-46, Feb. 14, 2013.

* cited by examiner

BIDIRECTIONAL SATELLITE COMMUNICATIONS

PRIORITY

This application claims the benefit, under 35 U.S.C. § 119(e), of U.S. Provisional Patent Application No. 62/440,238, filed 29 Dec. 2016, which is incorporated herein by reference.

TECHNICAL FIELD

This disclosure generally relates to satellite communications.

BACKGROUND

To provide quality Internet service to unconnected residences around the globe, it is estimated that by 2020 aggregated user data-rates exceeding 100 Tbps will be required for the portion of the population that would be online simultaneously. The infrastructure required to make such a capacity practical necessitates major advancements in terrestrial, airborne, and space-borne telecommunications technologies.

It is estimated that at several Tbps telecom capacity per spacecraft, Internet delivery via satellites may become cost-competitive with the lowest-cost wired or wireless connectivity technologies. To realize this technological advance in telecom, substantial improvements in the capacity of today's satellite communications networks, whether in geostationary orbit (GEO) or medium-earth-orbit (MEO), low-earth-orbit (LEO) may be required.

Optical frequencies currently have a huge and unregulated spectrum. Current technologies for free-space optical/laser communications (lasercom) may allow multi-Tbps uplink capacity from a ground station to a MEO or GEO satellite along with Tbps-scale downlink capacity via a few beams. Currently, the total single spatial- and longitudinal-mode uplink laser power required to achieve 10 Tbps gateway link capacity per satellite is a limiting factor. Also, due to atmospheric effects, lasercom uplink and downlink availability per station may be limited (e.g., on the order of 50 to 60% for above average ground sites).

SUMMARY OF PARTICULAR EMBODIMENTS

Particular embodiments may provide a system and methods for achieving ground site diversity, with ground stations (that are visible to a satellite) located a few 100 km apart at atmospherically-independent weather cells. Particular embodiments may provide a system and methods for achieving multi-Tbps data-rates in communication with earth-orbiting satellites using a combination of Q/V- and E-bands. Particular embodiments may provide high link-availability uplink laser communications to Earth-orbiting satellites from atmospheric-diverse ground stations acting as gateways to terrestrial networks.

Particular embodiments may provide augmentation with radiofrequency (RF) and millimeter-wave (MMW) gateway links. Particular embodiments may provide a hybrid of laser communications and MMW links, where a lower capacity MMW transceiver is used as both as a means to achieve total higher capacity communications per satellite, and as a backup to the high rate lasercom link. Particular embodiments may use a combination of millimeter-wave (MMW) bands (Q/V, E, or W) to downlink data at high data-rates, while taking advantage of lightly-regulated MMW frequencies. Particular embodiments may use both single-input single-output (SISO) and multiple-input multiple-output (MIMO) MMW-band links with dispersed ground stations to further increase the downlink-data-rates. Particular embodiments may use optical (e.g., lasercom) gateway links at extremely high data-rates. Particular embodiments may use either SISO or MIMO RF/MMW beams as the sole downlink communications band.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a transceiver, in particular in geosynchronous orbit, may comprise a plurality of forward channel receivers, wherein at least one of the forward channel receivers receives (1) a forward channel laser communication beam transmitted from a ground station and (2) an E-band frequency having a bandwidth of 81-86 GHz;

a plurality of forward channel transmitters having different frequencies, wherein the forward channel transmitters transmit user beams to endpoint devices, wherein the user beams are derived from the forward channel laser and MMW communication beams;

a plurality of return channel receivers, wherein the return channel receivers receive user beams from the endpoint devices; and at least one return channel transmitter, wherein the return channel transmitter transmits a return channel laser communication beam to a ground station.

In an embodiment according to the invention, a transceiver may comprise one or more processors and a memory coupled to the processors comprising instructions executable by the processors, the processors being operable when executing the instructions to:

receive forward channel data transmitted by one or more uplink beams received at the forward channel receivers;

based on the forward channel data, generate a plurality of forward channel downlink signals, each of the forward channel downlink signals comprising at least a portion of the forward channel data; and for each of the forward channel downlink signals, transmit the forward channel downlink signal to one of the forward channel transmitters.

In an embodiment according to the invention, the processors may be operable when executing the instructions to:

receive return channel data transmitted by one or more uplink beams received at the return channel receivers;

based on the return channel data, generate a single return channel downlink signal comprising the return channel data; and transmit the return channel downlink signal to the return channel transmitter.

An endpoint device may comprise an end user client device, and wherein the user beams are RF signals impinging on laser communication beams.

An endpoint device may comprise a network gateway device, and wherein the user beams transmitted by the forward channel transmitters are laser communication beams transmitted in addition to E-band frequency signal having a bandwidth of 71-76 GHz.

The return channel laser communication beam may be transmitted in addition to a Q-band plus E-band frequency signal.

The return channel laser communication beam may be dual-polarized.

The transceiver may be located on a satellite in low-earth orbit or medium-earth orbit.

A single antenna feed of the transceiver may receive signals comprising multiple types of MMW bands simultaneously.

Each of the forward channel transmitters may transmit signals using frequencies on the Q/V-band. V-band, W+E band, or W band.

In an embodiment according to the invention, a system may comprise one or more processors and a memory coupled to the processors comprising instructions executable by the processors, the processors being operable when executing the instructions to:

receive forward channel data transmitted by one or more uplink beams received at a plurality of forward channel receivers communicably connected to the system, wherein at least one of the forward channel receivers receives (1) a forward channel laser communication beam transmitted from a ground station and (2) an E-band frequency having a bandwidth of 81-86 GHz;

based on the forward channel data, generate a plurality of forward channel downlink signals, each of the forward channel downlink signals comprising at least a portion of the forward channel data; and for each of the forward channel downlink signals, transmit the forward channel downlink signal to one of a plurality of forward channel transmitters communicably connected to the system, wherein the forward channel transmitters transmit, using different frequencies, user beams to endpoint devices, wherein the user beams are derived from the forward channel laser and MMW communication beams.

The processors may be operable when executing the instructions to:

receive forward channel data transmitted by one or more uplink beams received at the forward channel receivers;

based on the forward channel data, generate a plurality of forward channel downlink signals, each of the forward channel downlink signals comprising at least a portion of the forward channel data; and for each of the forward channel downlink signals, transmit the forward channel downlink signal to one of the forward channel transmitters.

The processors may be operable when executing the instructions to:

receive return channel data transmitted by one or more uplink beams received at a plurality of return channel receivers, wherein the return channel receivers receive user beams from the endpoint devices;

based on the return channel data, generate a single return channel downlink signal comprising the return channel data; and transmit the return channel downlink signal to a return channel transmitter, wherein the return channel transmitter transmits a return channel laser communication beam to a ground station.

In an embodiment according to the invention, a method of transmitting signals by a transceiver in geosynchronous orbit may comprise:

by a plurality of forward channel receivers, receiving forward channel data transmitted by one or more uplink beams, wherein at least one of the forward channel receivers receives (1) a forward channel laser communication beam transmitted from a ground station and (2) an E-band frequency having a bandwidth of 81-86 GHz;

by one or more processors of the transceiver and based on the forward channel data, generating a plurality of forward channel downlink signals, each of the forward channel downlink signals comprising at least a portion of the forward channel data;

by a plurality of forward channel transmitters having different frequencies, for each of the forward channel downlink signals, transmitting one or more user beams to one or more endpoint devices, wherein the user beams are derived from the forward channel laser and MMW communication beams;

by a plurality of return channel receivers, receiving return channel data transmitted by one or more uplink beams received at the return channel receivers, wherein the return channel receivers receive user beams from the endpoint devices;

by the one or more processors of the transceiver and based on the return channel data, generate a single return channel downlink signal comprising the return channel data; and by at least one return channel transmitter, transmitting the return channel downlink signal to a ground station.

DESCRIPTION OF EXAMPLE EMBODIMENTS

Particular embodiments may provide a means of providing high-capacity RF/MMW feeder link service for high-throughput satellites (e.g., targeting 10 Tbps uplink and downlink and an average link availability of ≥99.9%). Particular embodiments may provide a system and methods for achieving ground site diversity, with ground stations (that are visible to a satellite) located a few 100 km apart at atmospherically-independent weather cells. Particular embodiments may uplink laser communications beams to (e.g., MEO or GEO) satellites at data rates on the order of multi-Tbps from four to five ground stations at different weather cells to achieve station diversity resulting in high (e.g., >99%) link availability. Particular embodiments may provide augmentation with RF and MMW gateway links. Particular embodiments may provide a hybrid of laser communications and millimeter-wave (MMW) links, where a lower capacity MMW transceiver is utilized both as a means to enhance the communications capacity per satellite, and as a backup to the high rate lasercom link. Particular embodiments may provide a satellite downlink using a combination of MMW bands, e.g. Q/V-Band at approximately 46 to 56 GHz, plus E-band (71-76 GHz and 81-86 GHz), or Q/V plus W-band approximately 86 to 110 GHz), or E+W-bands, to achieve high communication bandwidths at lightly regulated frequencies. Use of Q/V and E-band together, for example, may come close to doubling the available spectrum. Particular embodiments may provide both SISO and MIMO MMW-band links with dispersed ground stations to further enhance the downlink data rate. Satellite uplink and downlink using a combination of MMW bands, e.g., Q/V-Band at approximately 46 to 56 GHz, plus E-band (approximately 71-76 GHz and 81-86 GHz) or plus W-band (approximately 86 to 110 GHz), or plus E+W-bands, to achieve high communications bandwidths at lightly regulated frequencies. Particular embodiments may use either SISO or MIMO RF/MMW beams as the sole downlink communications band. Particular embodiments may provide an optical (e.g., lasercom) feeder downlink to specific gateway links (as opposed to connecting directly to end users). To realize 10 Tbps capacity MMW feeder links, for example, the number of MMW ground stations may need to be scaled accordingly, and antenna sizes need to be enlarged to the maximum practical dimensions.

Figure 1:
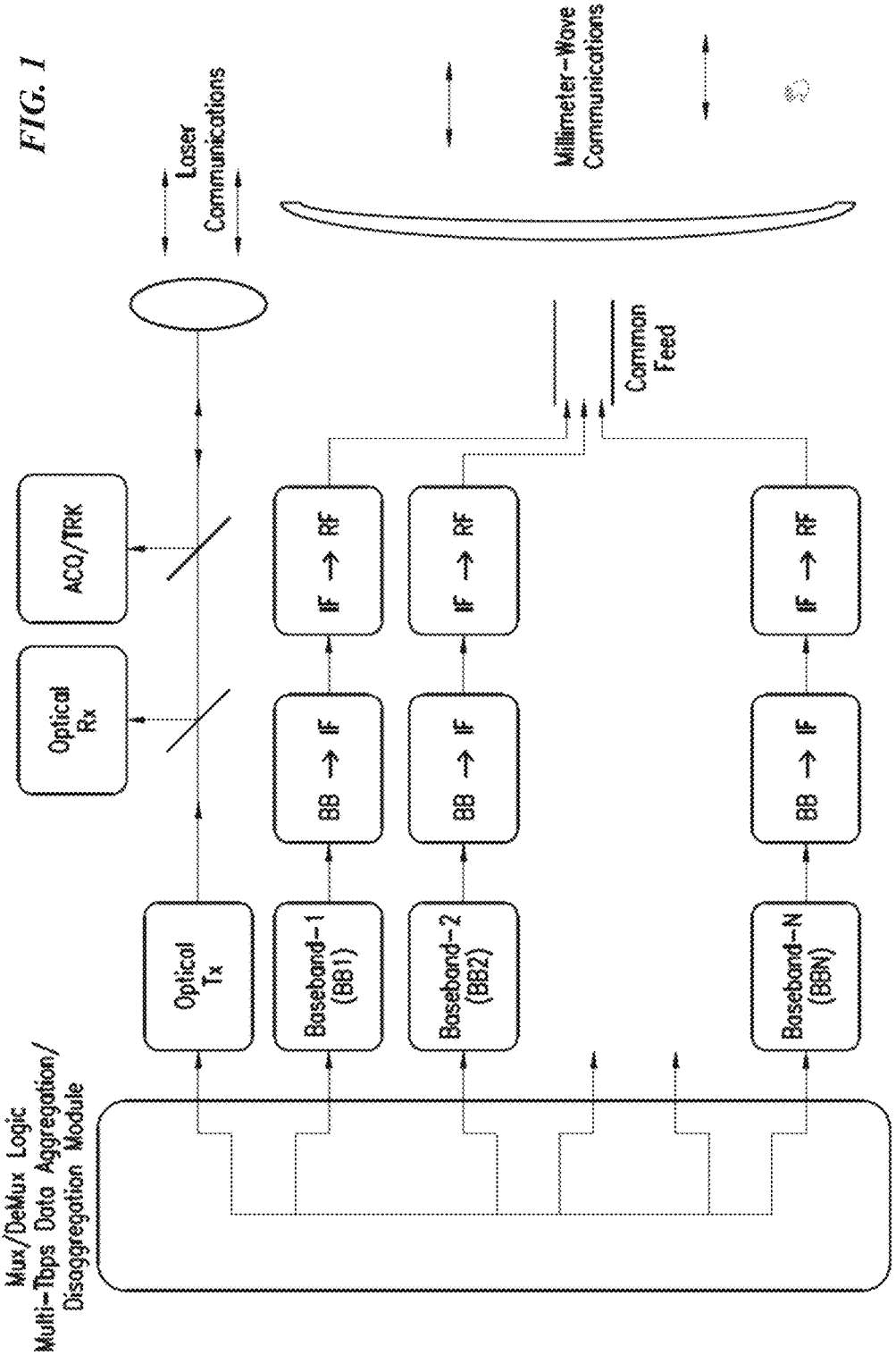
FIG. 1 is a schematic illustrating a first example configuration of a satellite transceiver.

FIG. 1 is a schematic illustrating a first example configuration of a satellite transceiver 100. Multi-Tbps data aggregate and disaggregation module 100 includes mux/demux logic to send data transmissions as laser communications beams 120 or as MMW communications 130 to and from ground stations and endpoint devices. In FIG. 1, the different MMW bands are illustrated by the N RF branches which radiate using a common reflector owing to size weight and power constraints associated with the satellite. The MMW bands are aggregated passively post power amplification; an example technique for accomplishing this is described in U.S. Patent Application Publication No. 2017/0317741 A1, titled "Wireless Communication Utilizing Post-Amplification Carrier Aggregation" and filed 27 Apr. 2016. A multi-band co-axial feed structure can also be used to passively aggregate the different MMW bands. The data carrying capacity in each MMW band is limited by the amount of RF bandwidth available and the maximum spectral efficiency possible in each band. In order to enable multi-Tbps of data several such bands will need to be multiplexed along with free space optical transmissions. In the figure free space optical transmission uses a separate aperture and its own transmission chain.

Figure 2:
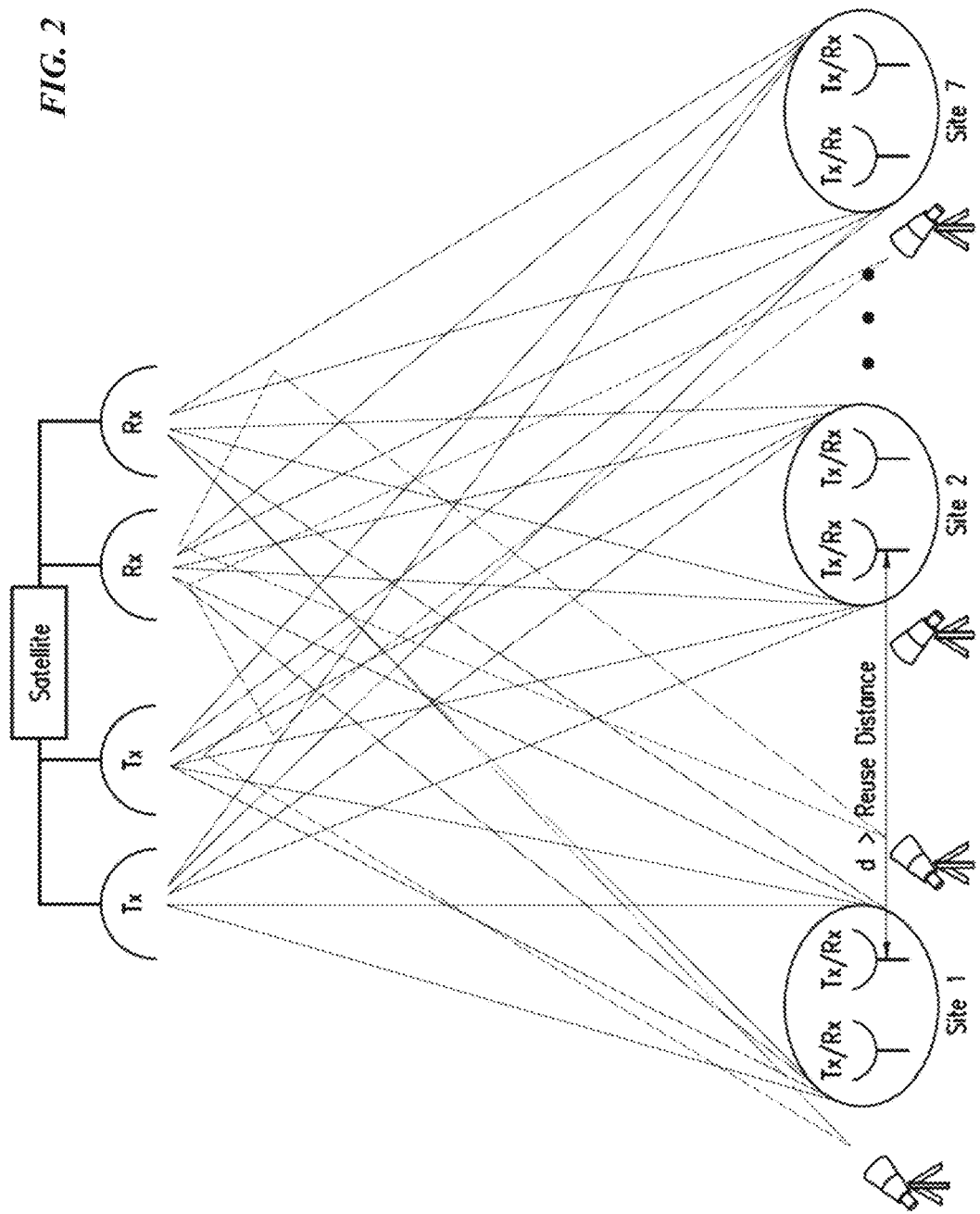
FIG. 2 is a schematic illustrating a first example system configuration of a satellite transceiver and a plurality of ground stations according to embodiments described herein.

FIG. 2 is a schematic illustrating a first example system configuration of a satellite transceiver and a plurality of ground stations according to particular embodiments described herein. FIG. 1 illustrates an example of a hybrid optical uplink and Q/V+E bands or E+W bands for downlink. An optical ground station may be located at each of four different sites and equipped with modulated uplink laser beams to the satellite. A distance d between any two sites may be configured to be greater than a maximum reuse distance for the beam. The sites may be located at atmospherically-independent weather cells (e.g., for station diversity).

Figure 3:
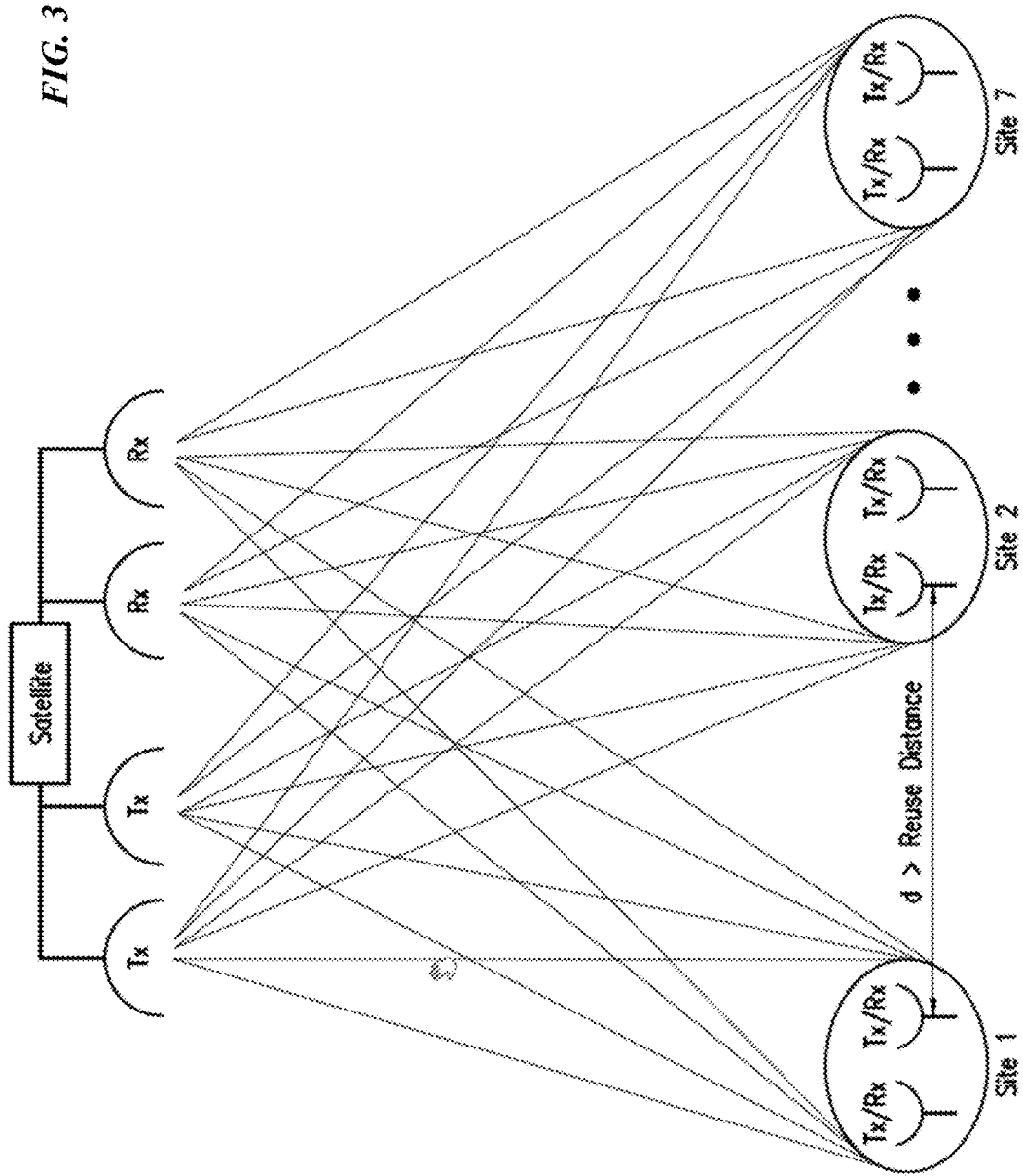
FIG. 3 is a schematic illustrating a second example system configuration of a satellite transceiver and a plurality of ground stations according to embodiments described herein.

FIG. 3 is a schematic illustrating a second example system configuration of a satellite transceiver and a plurality of ground stations according to particular embodiments described herein. FIG. 2 illustrates an example of a combined Q/V- and E-band at the satellite and at the ground station for the example of achieving 0.5 Tbps capacity bi-directionally with GEO satellites. As used herein, Tx denotes a transmitter and Rx denotes a receiver. As shown in FIG. 2, the transceiver may comprise two 3 m Tx antennae (one Q/V-band, and one E-band) and two 2.5 m Tx antennae (one Q/V-band, and one E-band), wherein the beams are dual-polarized. The ground stations may each comprise one E-band Tx/Tx 12 m antenna and one V-band Tx/Rx 12 m antenna, wherein the beams are dual-polarized. In particular embodiments, seven ground stations may be required to achieve an overall bandwidth of 0.5 Tbps.

In discussing the different communication bands, particular embodiments may be based on assumptions, such as, by way of example and not limitation: $K_a$-band uplink in the 27.5-30 GHz range (e.g., 2.5 GHz available spectrum), and $K_a$-band downlink in the 17.7-18.6 GHz, and 18.8-20.2 GHz (e.g., 2.3 GHz available spectrum); Q/V-band uplink in the 42.5-47, 47.2-50.2, 50.4-51.4 GHz range (e.g., >5 GHz available spectrum), and Q/V downlink in the 37.5-42.5 GHz range (e.g., 5 GHz available spectrum); E-band uplink in the 81-86 GHz (e.g., 5 GHz available spectrum), and E-band downlink at 71-76 GHz (e.g., 5 GHz available spectrum).

In comparison with conventional GEO satellite $K_a$-band communications, the number of simultaneous beams for 0.5 Tbps capacity in each direction (e.g., forward or return channel) may be fifteen beams for $K_a$- and Q/V-bands, or seven beams for an E- or Q/V and E band combination. To achieve high (e.g., ≥99.9%) link availability at this capacity, particular embodiments may need eighteen beams for $K_a$- and Q/V-bands, and nine beams for combined E- and Q/V- and E-bands (see FIGS. 2 and 3), based on assumptions of a 2.5-meter airborne antenna diameter and a 3-meter ground station diameter at any of the communications frequencies.

Figure 4:
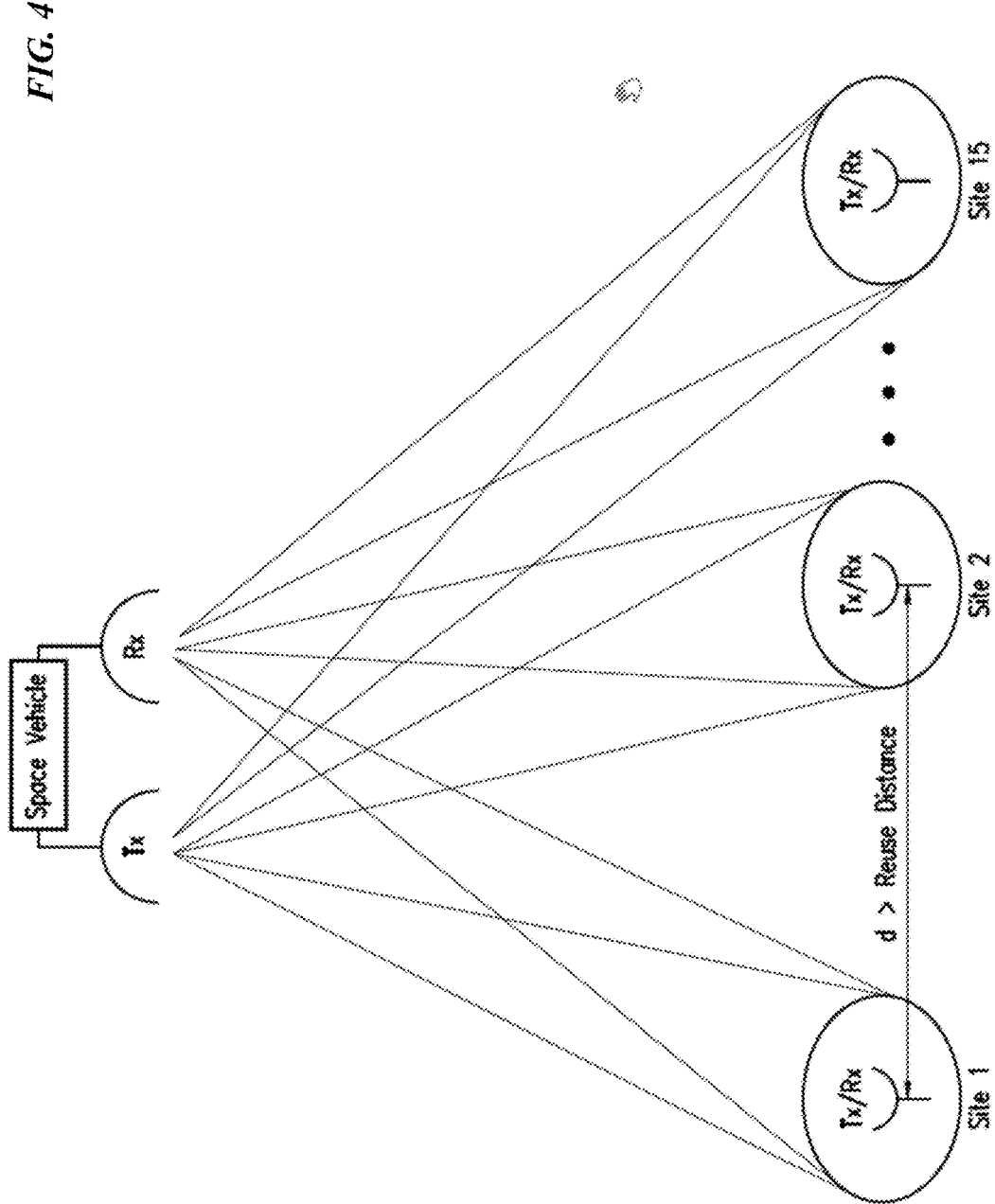
FIG. 4 is a schematic illustrating a third example system configuration of a space vehicle and a plurality of ground stations according to embodiments described herein.

FIG. 4 is a schematic illustrating a third example system configuration of a space vehicle (comprising the satellite communications payload) and a plurality of ground stations according to particular embodiments described herein. FIG. 3 illustrates multiple-site SISO at individual frequencies ($K_a$, V, or E). Such embodiments may be based on particular assumptions to achieve 0.5 Tbps capacity in each direction in links with space vehicle, such as, by way of example and not limitation: space vehicle includes one three-meter transmit antenna (at $K_a$, V, or E), one 2.5-meter receive antenna ($K_a$, V, E), and dual-polarized beams; ground station includes: one twelve-meter transmit and receive antenna, and dual-polarized beams. In particular embodiments, the number of sites to achieve 0.5 Tbps at E- or Q/V-band may be fifteen.

Figure 5:
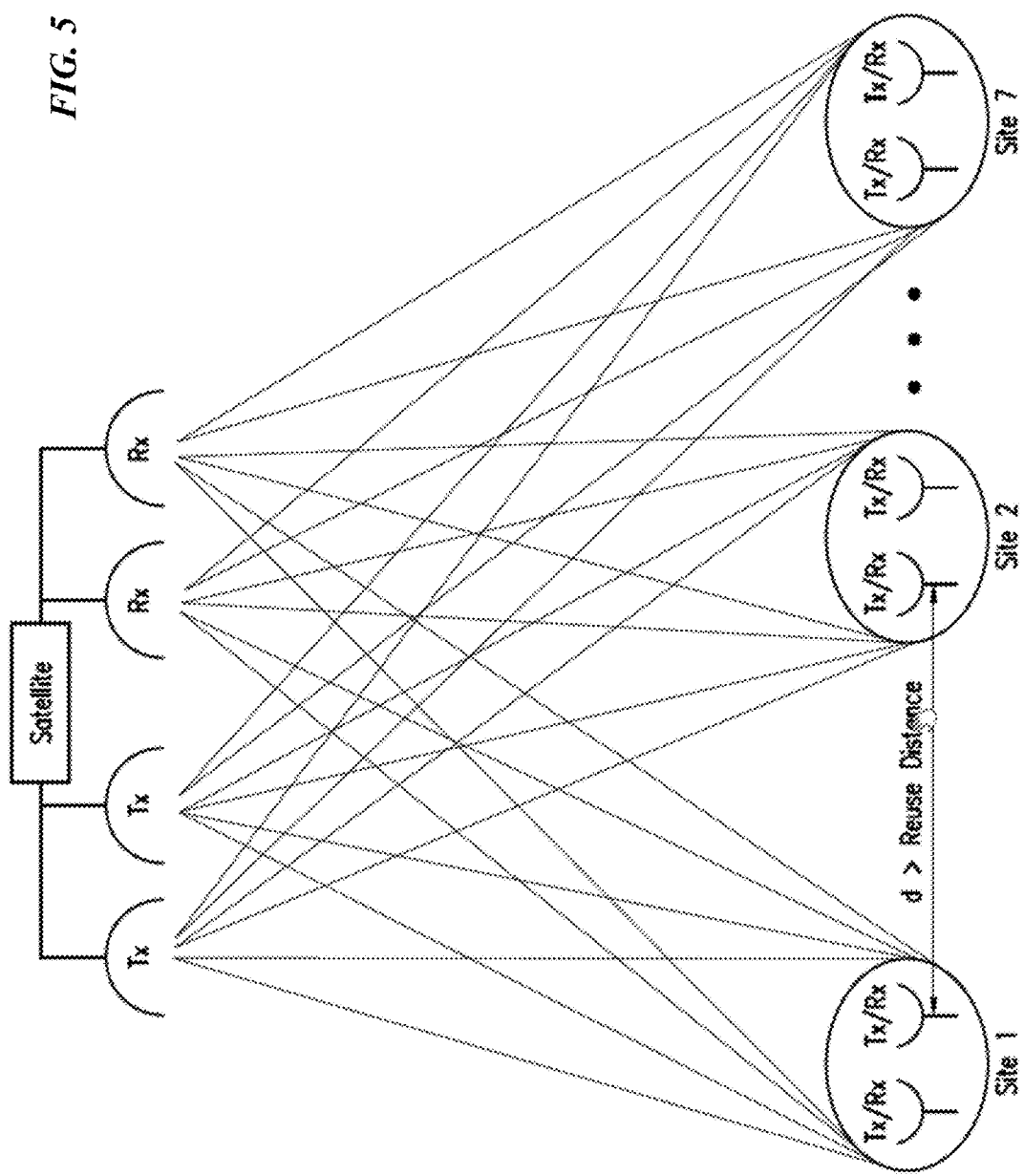
FIG. 5 is a schematic illustrating a fourth example system configuration of a satellite transceiver and a plurality of ground stations according to embodiments described herein.

FIG. 5 is a schematic illustrating a fourth example system configuration of a satellite transceiver and a plurality of ground stations according to particular embodiments described herein. Particular embodiments provide multiple-site SISO at combined Q/V and E-bands. Particular embodiments may be based on particular assumptions to achieve 0.5 Tbps capacity in each direction in links with GEO satellites, such as, by way of example and not limitation: spacecraft-side includes two 3-meter transmit antennas (e.g., one Q/V-band, one E-band), two 2.5-meter receive antennas (e.g., one Q/V-band, one E-band), and dual-polarized beams; ground station includes: one 12-meter transmit and receive antenna Q/V-band antenna, one 12-meter E-band antenna, and dual-polarized beams. The number of sites to achieve 0.5 Tbps at E- or Q/V-band may be cut to about half (to 7 sites) relative to use of other communications bands by themselves.

Figure 6:
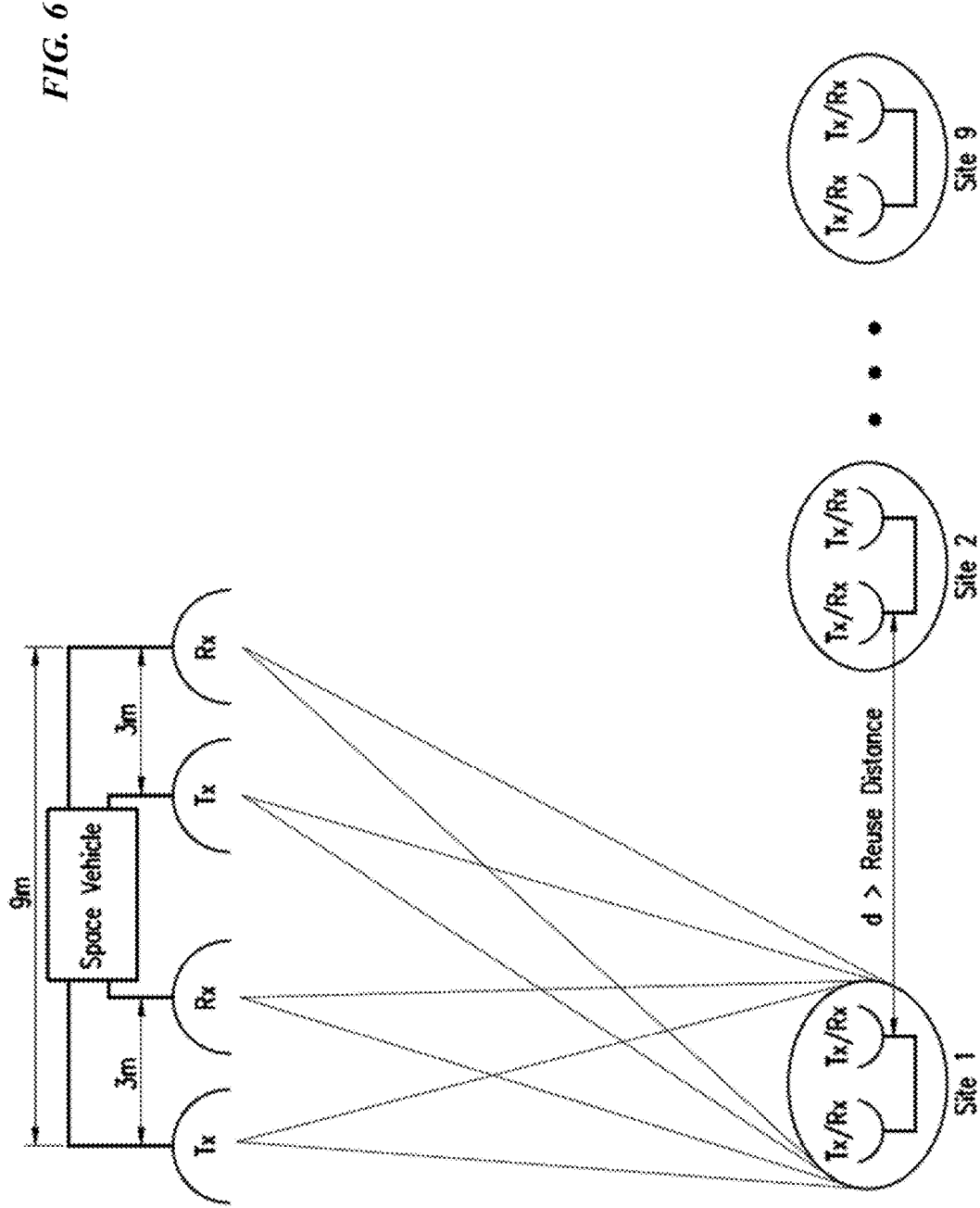
FIG. 6 is a schematic illustrating a fifth example system configuration of a space vehicle and a plurality of ground stations according to embodiments described herein.

FIG. 6 is a schematic illustrating a fifth example system configuration of a space vehicle and a plurality of ground stations according to particular embodiments described herein. Particular embodiments provide a multiple-site 2×2 MIMO architecture: to achieve 0.5 Tbps bi-directionally in links with space vehicles, particular embodiments may be based on assumptions, such as, by way of example and not limitation: four 2-meter antennas on the space vehicle, 6-meter spacing between transmitter and receiver antennas, and dual-polarized beam. The ground station may include: two 12-meter antennas. Required number of sites is 9.

Figure 7:
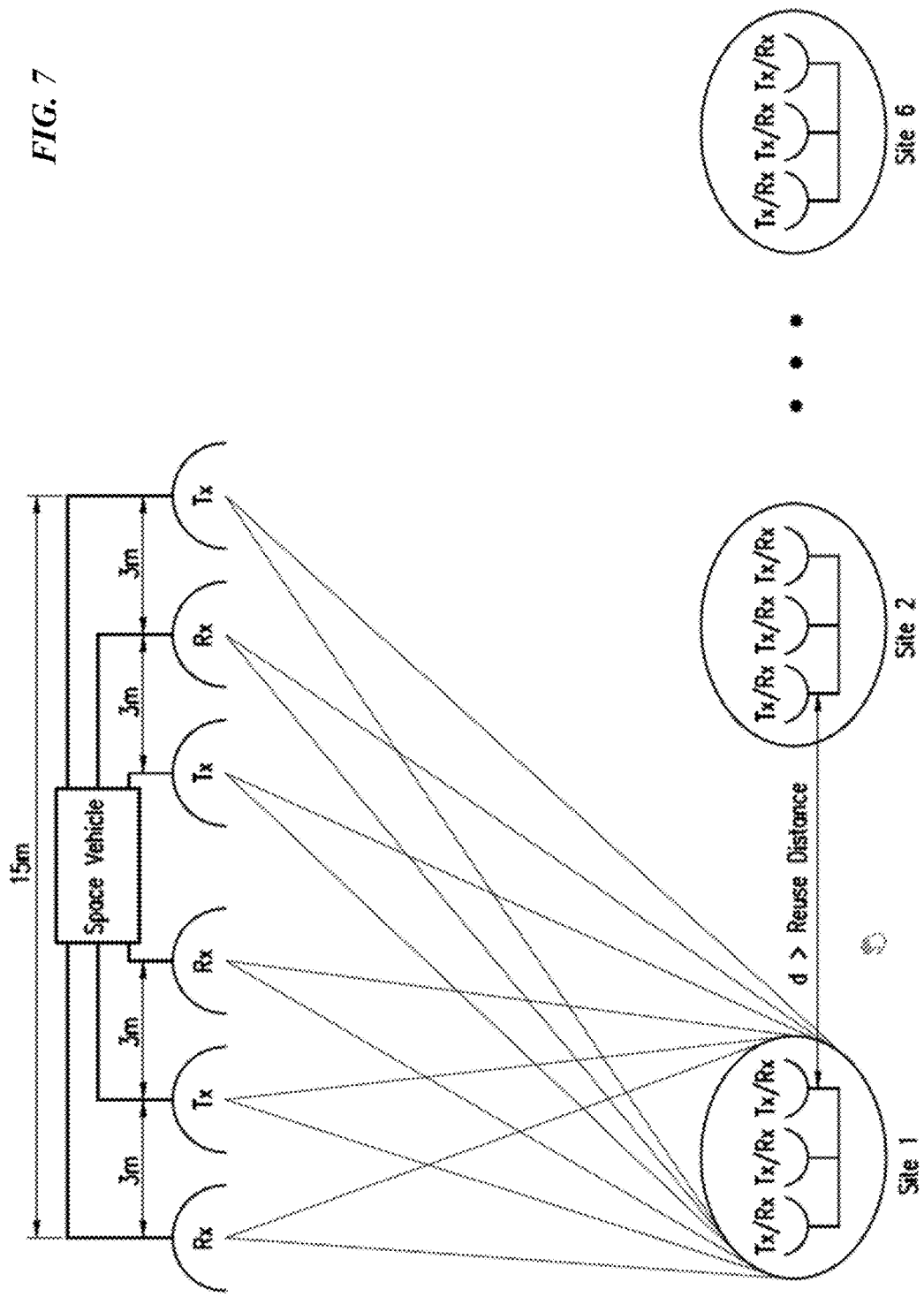
FIG. 7 is a schematic illustrating a sixth example system configuration of a space vehicle and a plurality of ground stations according to embodiments described herein.

FIG. 7 is a schematic illustrating a sixth example system configuration of a space vehicle and a plurality of ground stations according to particular embodiments described herein. Particular embodiments provide a multiple-site 3×3 MIMO architecture: to achieve 0.5 Tbps in each direction (GEO range), particular embodiments may be based on assumptions, such as, by way of example and not limitation: six 2-meter antennas on the space vehicle, 6-meter spacing between transmitter and receiver antennas, and dual-polarized beam. The ground station may include: three 12-meter antennas. Required number of sites is 6.

SISO Implementation of the Combined Bands. In discussing the different communication bands, particular embodiments are based on the following assumptions: Ka-band uplink in 27.5 to 30 GHz range (2.5 GHz available spectrum), and Ka-band downlink in the 17.7 to 18.6 GHz, and 18.8-20.2 GHz (2.3 GHz available spectrum); Q/V-band uplink in the 42.5-47, 47.2-50.2, 50.4-51.4 GHz range (>5GHz available spectrum), and Q/V downlink in the 37.5 to 42.5 GHz range (5 GHz available spectrum); E-band uplink in the 81 to 86 GHz (5 GHz available spectrum), and E-band downlink at 71 to 76 GHz) 5 GHz available spectrum). Particular embodiments may support different values in these communications bands.

Minimum Required Number of RF-Sites (in SISO mode). Particular embodiments are based on the following assumptions: that all sites can operate at 99% link availability, and that the sites are sufficiently distant that there is negligible inter-site correlation between probabilities of rain. Comparing with the conventional GEO satellite Ka-band communications (Table 1), the number of simultaneous beams, for example, at 0.5 Tbps capacity in each direction (forward or return) is 15 beams for Ka- and Q/V-bands, while 7 beams for E- or Q/V and E band combination. To achieve 99.9% link availability at this capacity, particular embodiments may require 18 beams for Ka- and Q/V-bands, and 9 beams for combined E-and Q/V- and E-bands. Particular embodiments are based on the following assumptions: 2.5-meter airborne antenna diameter and 3-meter ground station diameter at any of the communications frequencies.

Particular embodiments provide targeting system-wide capacity of 0.5 Tbps. Assuming that all sites can operate at high (e.g., 99%) link availability, and that the sites are sufficiently distant from each other such that there is negligible inter-site correlation between probabilities of rain, link analysis may indicate the number of required sites for different frequencies of SISO communications and system availability. By way of example and not limitation, 41 beams may be required for $K_a$-band communications, 15 beams may be required for Q/V-band and E-band communications, and 7 beams may be required for links that use a combination Q/V and E bands. In all cases, the transmit aperture diameter may be 3 meters and the receiver aperture diameter may be 2.5 meters.

Targeting 99.99% system availability at this capacity may require 45 beams at $K_a$-band, 18 beams for Q/V- or E-band, and only 9 beams for Q/V- and E-band combination. The 3 additional beams (needed for availability) may be in hot standby: ready to pick up some load when one or more beams go down due to weather. Power consumption for these beams is reduced primarily due to solid-state-amplifiers being used in a low duty cycle and digital electronics where consumption is based on data throughput FPGA demodulator/decoder, and I/Q modulator and digital to analog converter. Very low data rate signals may continue to be sent to the 3 back-up sites to ensure rapid switchover to full data rate is possible. The combined Q/V- and E-band configuration may use 9 dual-polarized beams on each band and only 9 versus 18 ground stations. Table 1 summarizes the minimum required number of RF/MMW sites.

TABLE 1

The minimum required number of RF/MMW for different system availability assumptions.

| Required number of sites (99% site availability assumed) | $K_a$- Band | Q/V Band | E- Band | Q/V + E Combined |
|---|---|---|---|---|
| Capacity ≥ 0.5 Tbps (GEO range) | 41 | 15 | 15 | 7 |
| 99% system availability | 43 | 16 | 16 | 8 |
| 99.9% system availability | 44 | 17 | 17 | 9 |
| 99.99% system availability Assumptions | 45 | 18 | 18 | 9 |
| Satellite transmit aperture (m) | 3 | 3 | 3 | 3 |
| Satellite receive aperture (m) | 2.5 | 2.5 | 2.5 | 2.5 |

Table 2 shows examples values for mass, power, and normalized cost for all three options, along with the parameters that may significantly impact the terminal cost. For the 18-beam single-band case, 36 dual-redundant solid-state power amplifiers (SSPAs) may be used. The combined dual-band embodiment reduces the number of unique ground stations from 18 to 9. Depending on the satellite configuration, a boom may be required.

TABLE 2

Mass, power, and normalized cost (capital expenditures (CAPEX) and operating expenses (OPEX)) values for V, E, and V + E combined bands to achieve high rate capacity.

| Parameters | Q/V-Band | E-Band | Q/V + E Combined |
|---|---|---|---|
| Mass (kg) | 220 | 220 | 310 |
| Power consumption (W) | 1170 | 1250 | 1300 |
| Number of antennas | 2 | 2 | 4 |
| Number of dual-pol feeds | 18 | 18 | 18 |
| Number of redundant SSPAs | 36 | 36 | 36 |
| Relative CAPEX cost (normalized) | 1 | 1.2 | 1.1 |
| Relative OPEX cost (normalized) | 1.38 | 1.45 | 1 |

Particular embodiments may utilize Multiple-Input Multiple-Output (MIMO) to scale up the capacity. Again, the combined Q/V and E-band system may be applied here to further increase the satellite communications capacity. MIMO builds on the basic SISO architecture using the same receiver and transmitter chain. However, the required numbers of chains may differ. Each transmitter has the capability to send a unique dual-polarized stream to multiple locations (for availability), with one site being used at a time (FIGS. 4 and 5). The 2×2 and 3×3 architectures each send 2 or 3 such sets of streams to the active site where the receiver provides the signal processing to separate out the streams using a spatial tie equalizer (FIG. 6).

Figure 8:
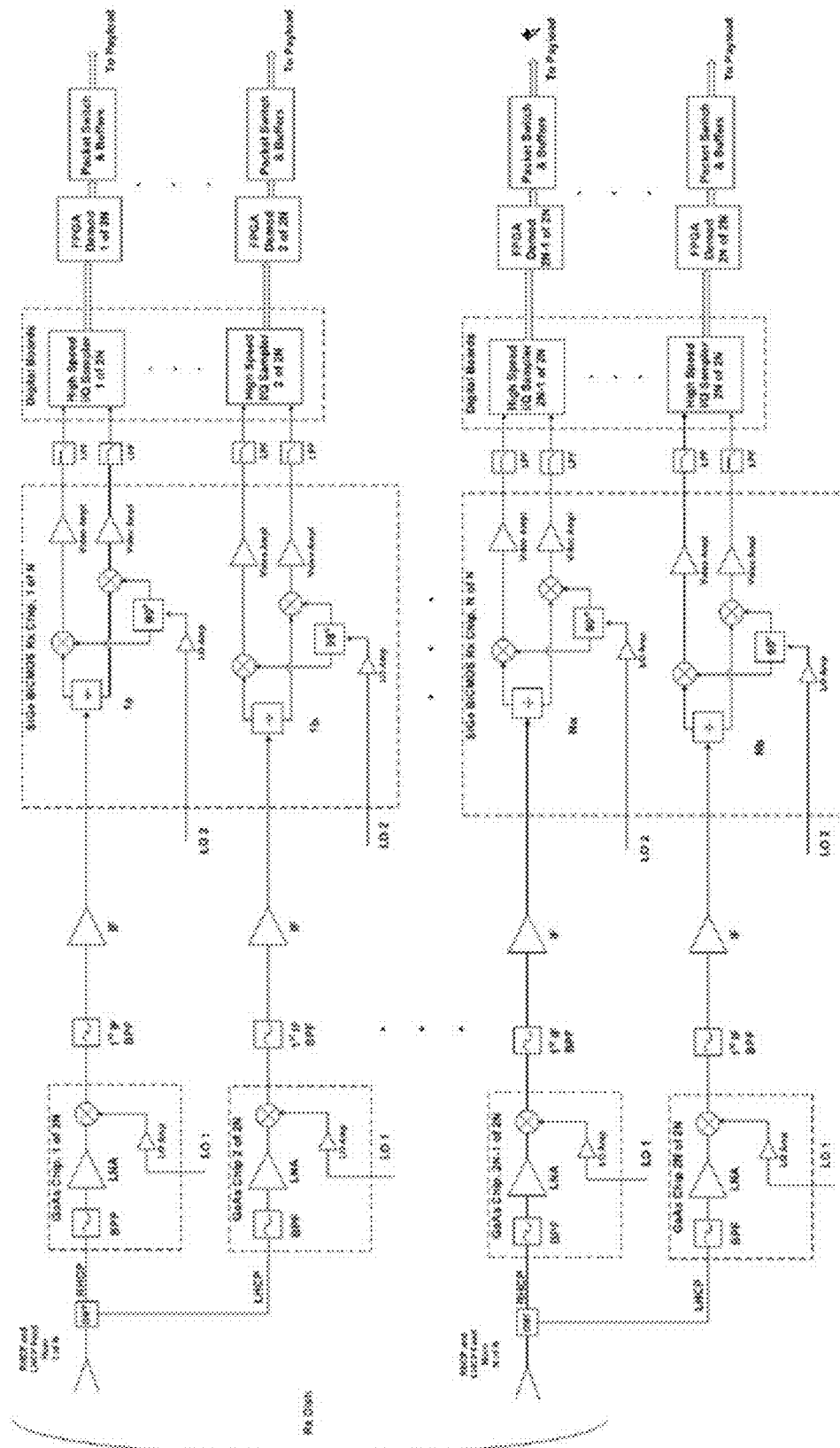
FIG. 8 is a schematic illustrating an example configuration of a satellite feeder link receiver for providing SISO transmissions.

FIG. 8 is a schematic illustrating an example configuration of a satellite feeder link receiver for providing SISO transmissions. The signals received on the various feeds go through an ortho-mode transducer to split them into Left Hand Circularly Polarized (LHCP) and Right Hand Circularly Polarized (RHCP) signals which are then downconverted to a common Intermediate frequency. The various intermediate frequency signals are downconverted using an I/Q receiver. The analog I/Q signals are sampled at Nyquist rate and sent to the payload after buffering and packet switching.

Figure 9:
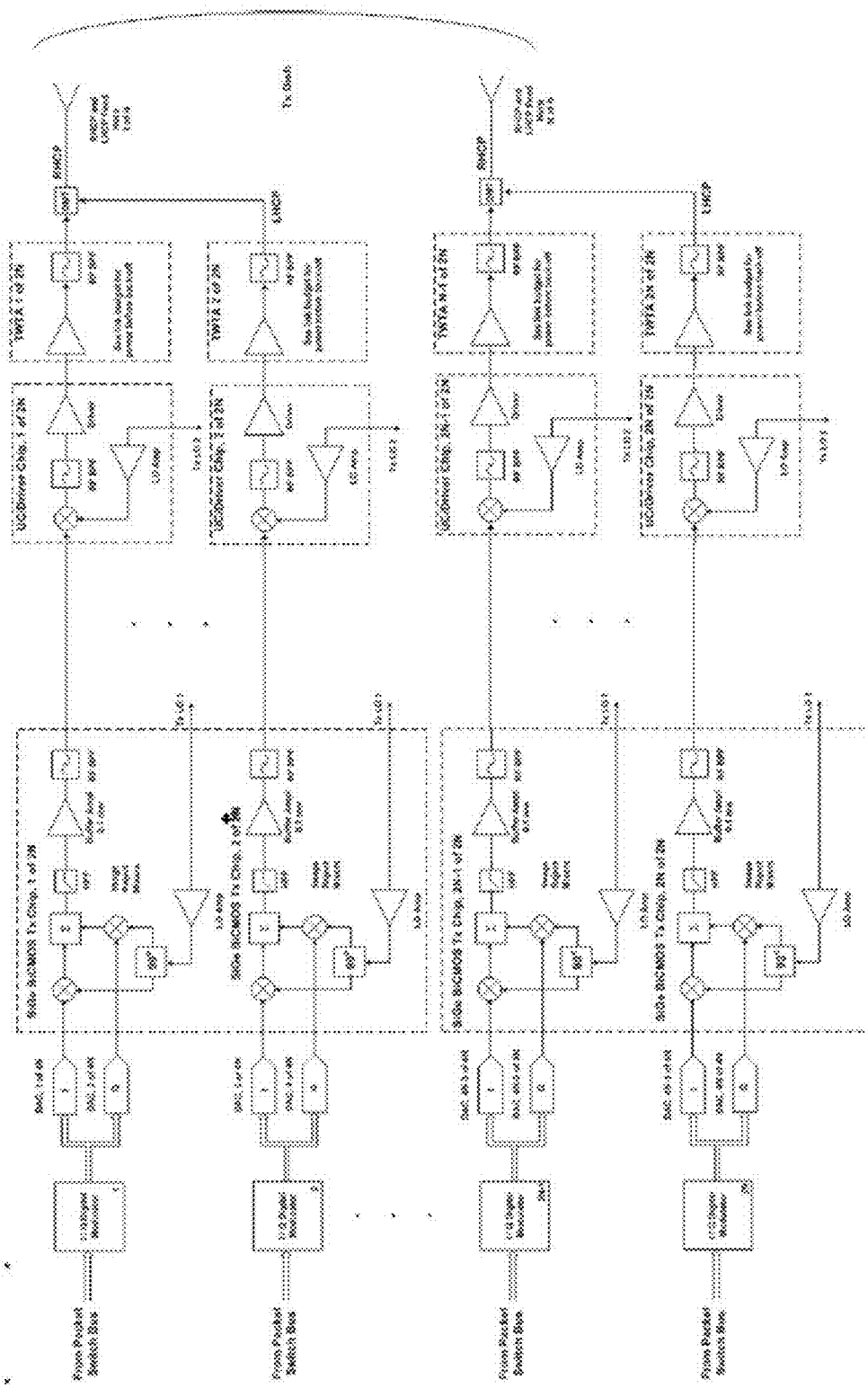
FIG. 9 is a schematic illustrating an example configuration of a space-vehicle feeder link transmitter for providing SISO transmissions.

FIG. 9 is a schematic illustrating an example configuration of a space-vehicle feeder link transmitter for providing SISO transmissions. FIG. 9 shows several data streams that are upconverted through an I/Q mixer structure to a common Intermediate frequency. The IF signals in different branches are upconverted to a variety of different MMW bands, which are then amplified using travelling waveguide tube amplifiers and radiated using a common dish reflector.

Figure 10:
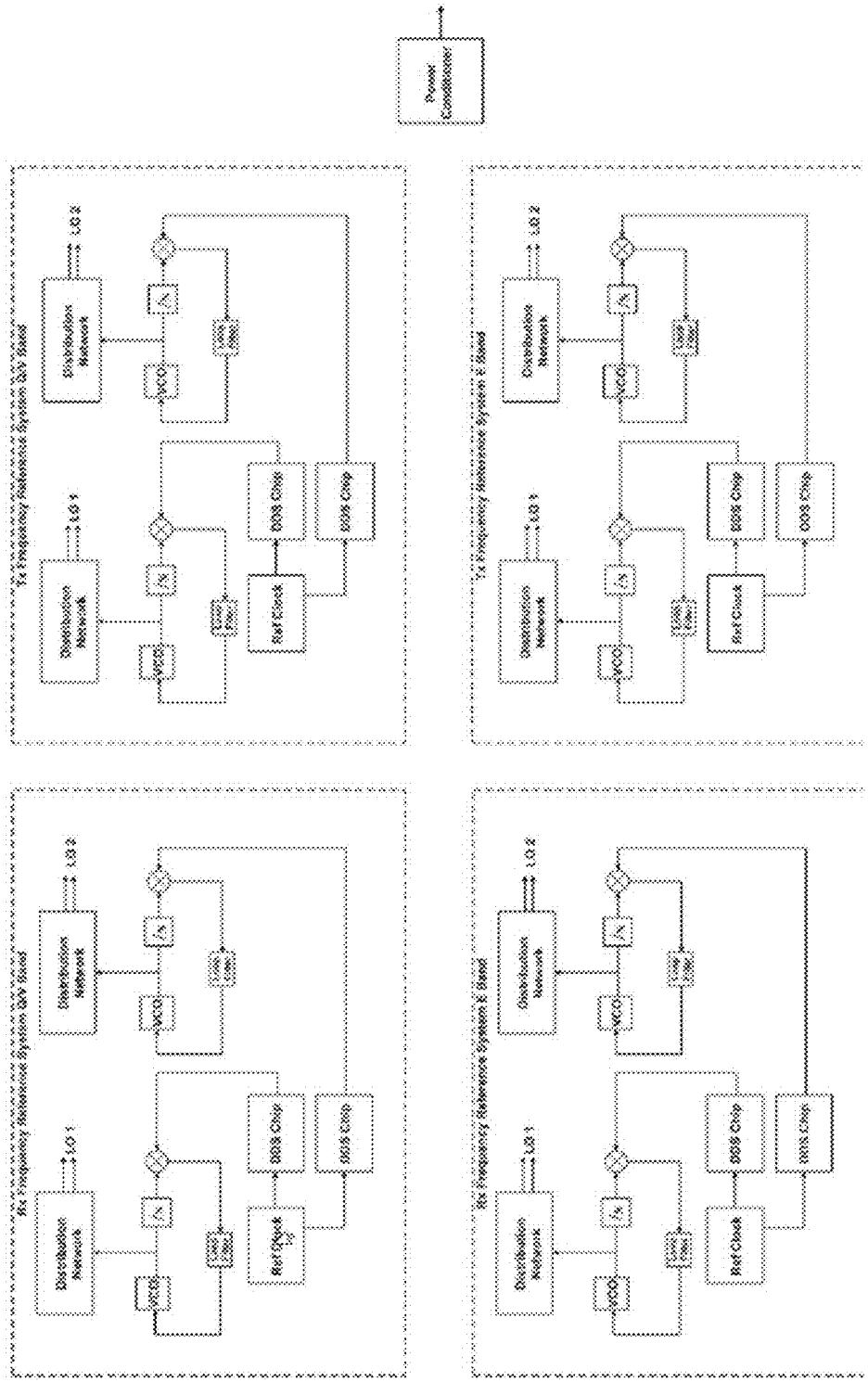
FIG. 10 is a schematic illustrating an example frequency reference system for providing SISO transmissions. In this example, individual bands may use either the Q/V- or E-band system, and a combination of bands may use both systems.

FIG. 10 is a schematic illustrating an example frequency reference system for providing SISO transmissions. In this example, individual bands may use either the Q/V- or E-band system, and a combination of bands may use both systems. The figure shows direct digital synthesis chips to generate the two LOs required in a typical super-heterodyne architecture.

Figure 11:
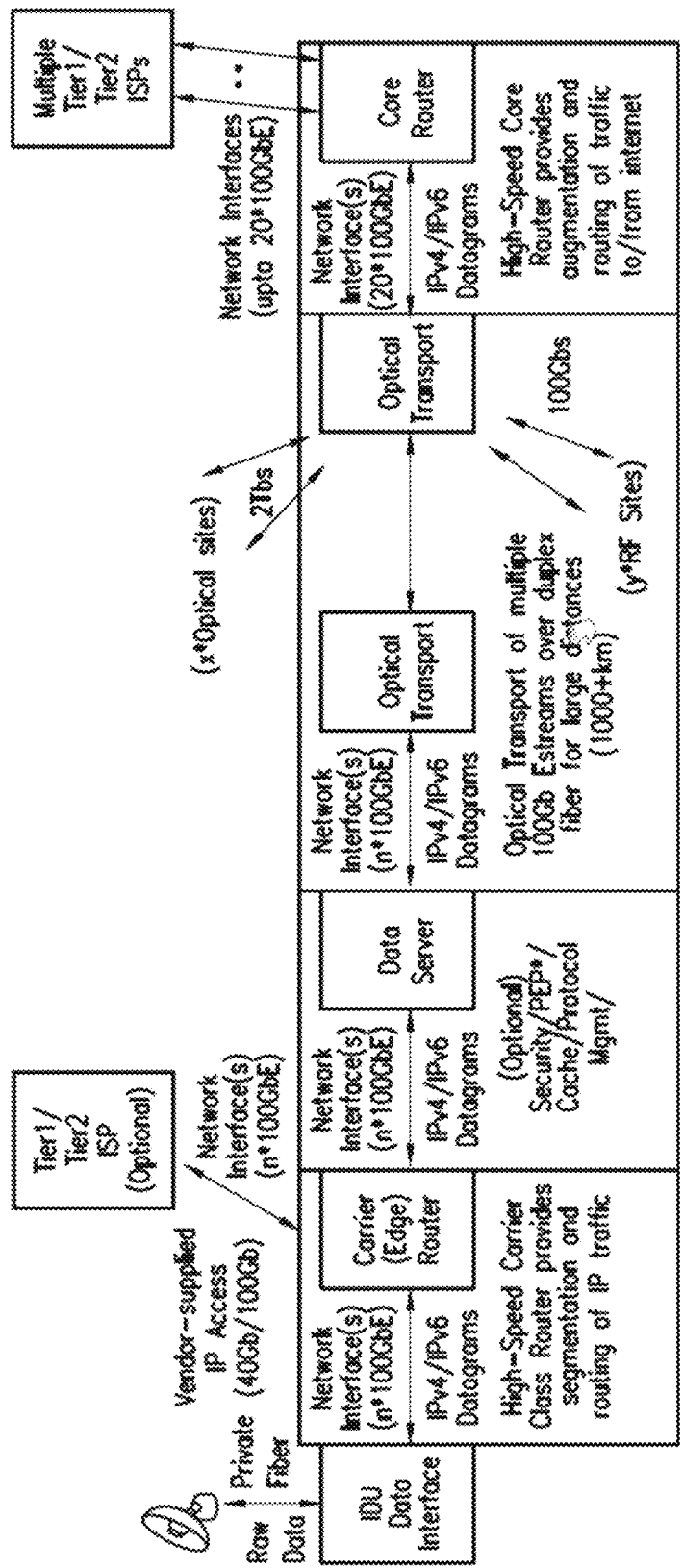
FIG. 11 is a schematic illustrating an example configuration of a ground station.

FIG. 11 is a schematic illustrating an example configuration of a ground station. This example identifies: the need for fiberoptic access at the ground station (SISO/MIMO/Optical Ground Station Access); the need for a high-speed edge router to effectively manage data movement—for example requiring fast hardware pluse, for example, 100 GbE interfaces; Data Server and switch infrastructure for data management beyond just passing packets; Optical Transport hardware providing wavelength conversion and wavelength multiplexing over long-haul; Core Router with larger backbone to handle maximum data-rate to/from centralized location and data handoff to ISPs; and Vendor access to connect high-rates to the Internet.

Figure 12:
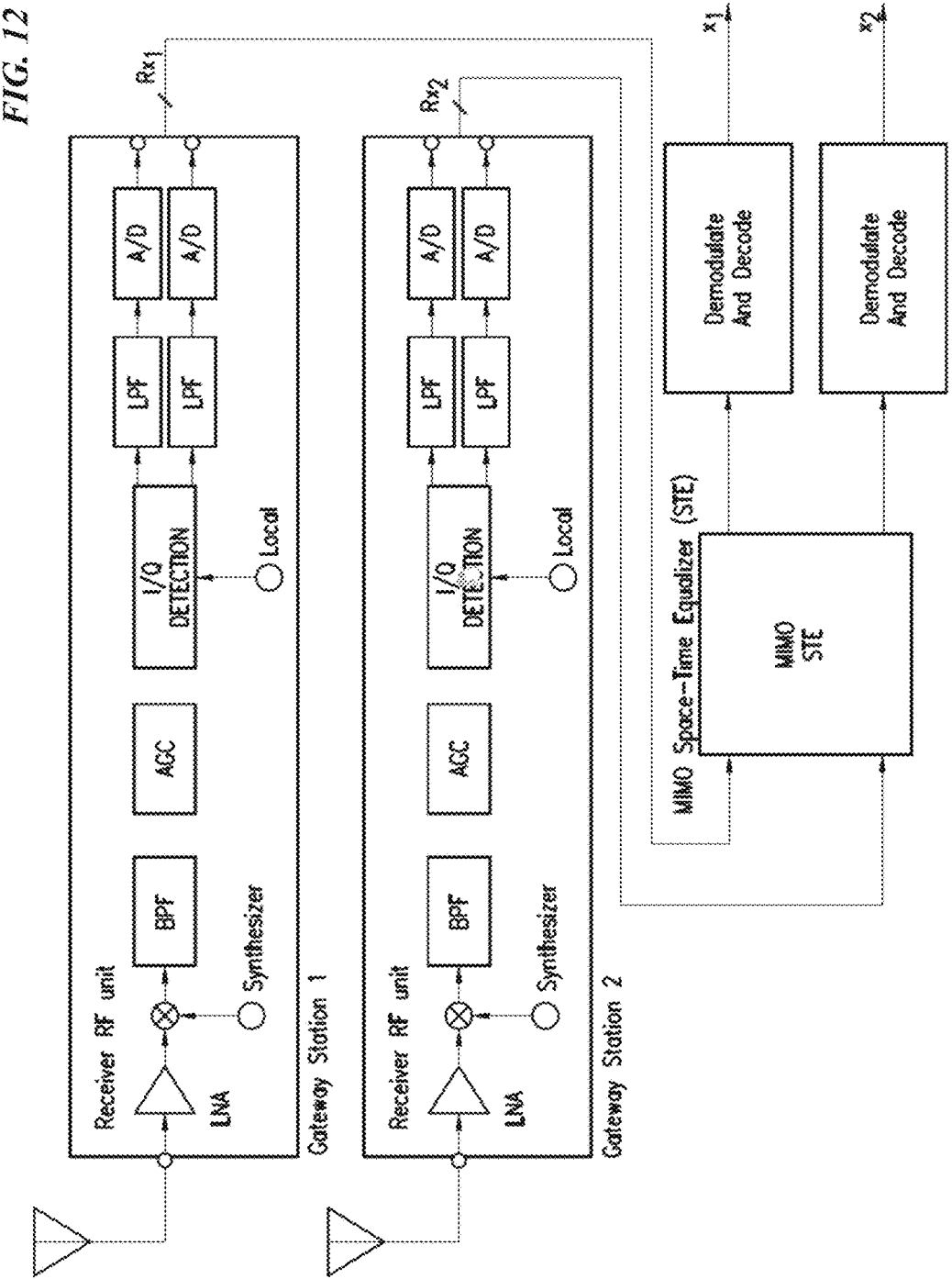
FIG. 12 is a schematic illustrating an example signal processing design according to embodiments described herein.

FIG. 12 is a schematic illustrating signal processing according to particular embodiments described herein. MIMO builds on the basic SISO architecture using the same receiver and transmitter chain. However, the required numbers of chains may differ. Each transmitter has the capability to send a unique dual-polarized stream to multiple locations (for availability), with one site being used at a time. In the example embodiment of N×N MIMO, N sets of streams (e.g., 2×2 and 3×3 architectures each send 2 or 3 such sets of streams) to the active site where the receiver provides the signal processing to separate out the streams using a Spatial Time Equalizer ("STE").

Figure 13:
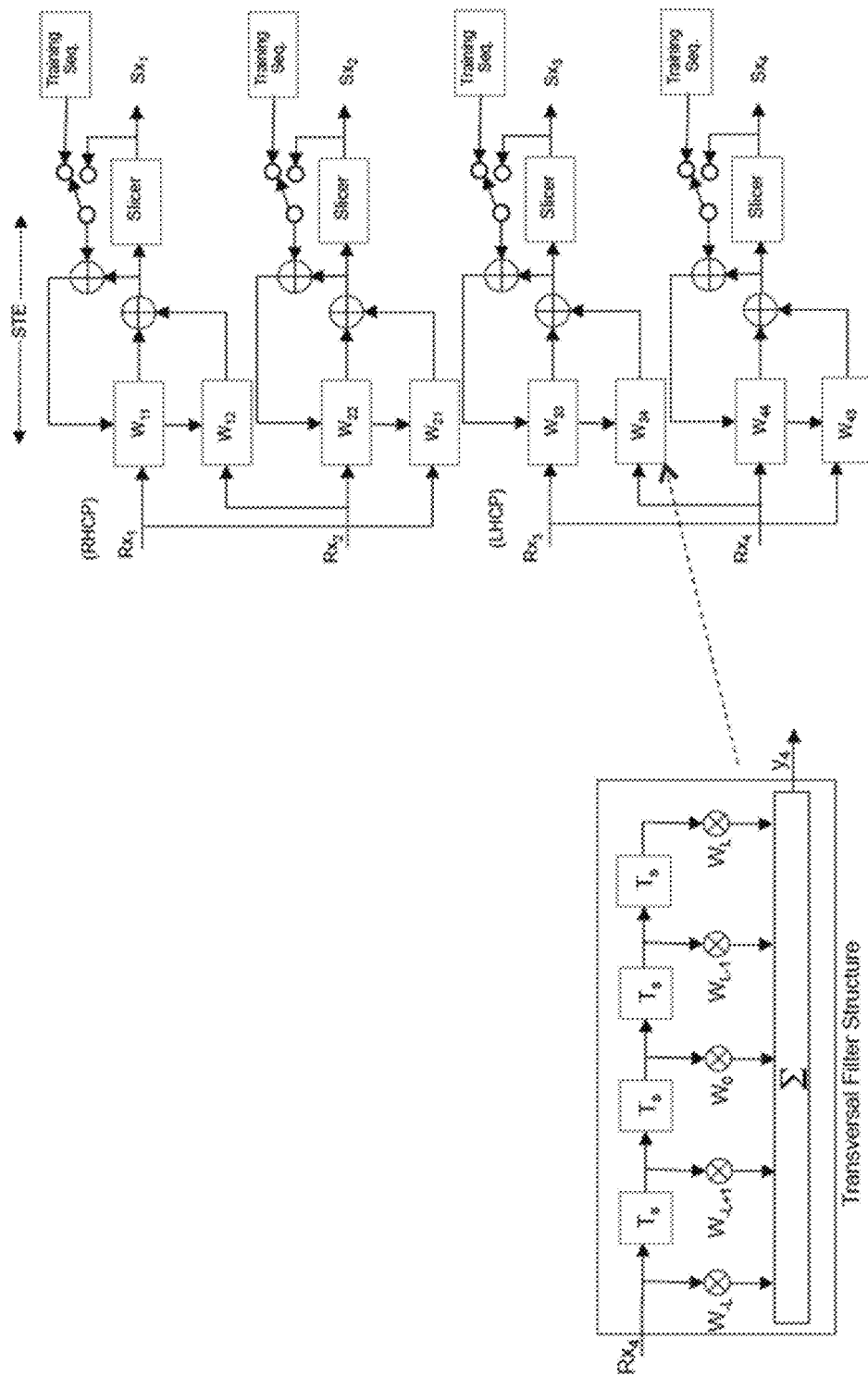
FIG. 13 is a schematic illustrating a 2×2 MIMO architecture for dual polarization.

FIG. 13 is a schematic illustrating a 2×2 MIMO architecture for dual polarization. The figure shows the least mean squares ("LMS") algorithm implementing the STE along with some additional detail for one of the eight weights. Each complex weight has a number of taps in the transversal filter based on time-bandwidth product and multipath. Note that the antenna may also contribute to internal multipath since the space vehicle body may contribute large reflections into the side lobes of the antennae.

Analysis indicates that MIMO requires fewer sites for both 2×2 and 3×3 compared to SISO to achieve both the minimum required capacity and availability. The apertures have slightly reduced size, but must be configured in a uniform linear array. This may require booms with joints to reposition from the stowed configuration. For example, the 2×2 requires a total of four 2-meter antennas while the 3×3 requires six 2-meter antennas.

This configuration may add significant mass to the satellite but is partially offset by the reduced number of parallel channels. Each simultaneous channel may require 2×N receive and transmit chains where N is the MIMO dimension.

TABLE 3

Space Time Equalizer Complexity

|  | 2 × 2 MIMO | | 3 × 3 MIMO | |
|---|---|---|---|---|
| Bands→ | | | | |
|  | Q/V | E | Q/V | E |
| Number of simultaneous beams of capacity | 9 | 9 | 6 | 6 |
| Number of beams for availability | 12 | 12 | 8 | 8 |
| HPA power before back-off | 6.2 | 7.2 | 5.2 | 6.1 |
| Back-off (dB) | 2.1 | 2.1 | 2.1 | 2.1 |
| Transmit aperture size | 2 | 2 | 2 | 2 |
| Receive aperture size | 2 | 2 | 2 | 2 |

Mass and power for all four options are summarized in Table 4 along with parameters that most drive the terminal cost. For all cases, dual redundant SSPAs are used. The 3×3 MIMO reduces the number of ground sites to eight at the cost of a more complex space vehicle. The MIMO mass is noticeably higher than similar SISO cases as booms have been assumed necessary to position the antennas and clear the SV service link antennas.

TABLE 4

Summary of Key MIMO Parameters

| Bands→ | | | | |
|---|---|---|---|---|
|  | Q/V 2 × 2 | E 2 × 2 | Q/V 3 × 3 | E 3 × 3 |
| Mass (kg) | 410 | 410 | 536 | 536 |
| Power (W) | 1573 | 1684 | 1491 | 1591 |
| Number of antennas | 4 | 4 | 6 | 6 |
| Number of beams for availability | 12 | 12 | 8 | 8 |
| Number of dual-pol feeds | 24 | 24 | 24 | 24 |
| Number of Rx and Rx chains | 48 | 48 | 48 | 48 |

As shown in the table below, for particular embodiments implementing 2×2 MIMO, per site capacity may be 70% higher than SISO. V- and E-bands may need nine sites to achieve 500 Gbps (for capacity). With 2×2 (2 receive and 2 transmit antennas) MIMO, the number of simultaneous beams for capacity may be nine for either Q/V or E-bands assuming high (e.g., 99.99%) system availability. In particular embodiments, the number of beams required for high link availability may be twelve beams. Conversely, for the example embodiment of 3×3 MIMO, only six simultaneous beams may be needed for high availability, and only eight simultaneous beams for high availability, again using either Q/V- or E-bands. In either case, use of a 2-meter diameter transmitter apertures and 2-meter diameter receiver apertures is assumed.

The 2×2 per site capacity may be approximately 70% higher than SISO. Also, Q/V- and E-bands require only nine sites to achieve 0.5 Tbps bi-directionally in links with GEO satellite, compared with 23 sites for $K_a$-band. In this particular example, for ground-to-satellite links, flight antenna separation at the satellite may be eight meters for all bands, while antenna separation on the satellite may be eight meters for $K_a$-band, and six meters for Q/V- or E-bands. These values are summarized in Table 5.

TABLE 5

2 × 2 MIMO (2 receive and w transmit antennas) requirements, and distance separations for the cases of uplink and downlink.

| | Bands→ | | |
|---|---|---|---|
| | $K_a$ | V | E |
| Uplink (Ground to Satellite) | | | |
| Number of sites to exceed 0.5 Tbps | 23 | 9 | 9 |
| Antenna separation on the satellite (m) | 8 | 8 | 8 |
| Antenna separation on the ground (km) | 25 | 21 | 11.5 |
| Downlink (Satellite to Ground) | | | |
| Number of sites to exceed 0.5 Tbps | 23 | 9 | 9 |
| Antenna separation on the satellite (m) | 8 | 6 | 6 |
| Antenna separation on the ground (km) | 37 | 23.5 | 13 |

Table 6 summarizes the 3×3 MIMO (3 receive and 3 transmit antennas) antenna requirements and separations for uplink and downlink. The 3×3 per site capacity may be approximately 2.5 times greater than SISO. Also, V- and E-bands may require only 6 sites to achieve 0.5 Tbps at GEO range, compared with 15 sites for $K_a$-band.

TABLE 6

3 × 3 MIMO Capacity for Ka, V/Q- and E-bands (required number of sites to achieve 0.5 Tbps data-rate)

| | Bands→ | | |
|---|---|---|---|
| | $K_a$ | V | E |
| Uplink (Ground to Satellite) | | | |
| Number of sites needed to exceed 0.5 Tbps | 15 | 6 | 6 |
| Antenna separation on the satellite (m) | 8 | 8 | 8 |
| Antenna separation on the ground (km) | 16.5 | 21 | 11.5 |
| Downlink (Satellite to Ground) | | | |
| Number of sites needed to exceed 0.5 Tbps | 15 | 6 | 6 |
| Antenna separation on the satellite (m) | 8 | 6 | 6 |
| Antenna separation on the ground (km) | 25 | 16 | 8.5 |

Link availability—Particular embodiments provide targeting-system-wide MMW capacity of 0.5 Tbps at GEO range. Particular embodiments may be based on an assumption that all sites can operate at high link availability while remaining sufficiently separated and distant so that there is low inter-site correlation between probabilities of rain. Table 5 summarizes the number of sites to achieve different degrees of link availability.

TABLE 7

Number of sites required for achieving 0.5 Tbps bi-directionally n links with GEO satellites, and at different system availabilities.

| | MIMO 2 × 2 | | MIMO 3 × 3 | |
|---|---|---|---|---|
| | Bands→ | | | |
| | V | E | V | E |
| 0.5 Tbps capacity | 9 | 9 | 6 | 6 |
| 99% system availability | 10 | 10 | 7 | 7 |
| 99.9% system availability | 11 | 11 | 8 | 8 |
| 99.99% system availability | 12 | 12 | 8 | 8 |

Figure 14:
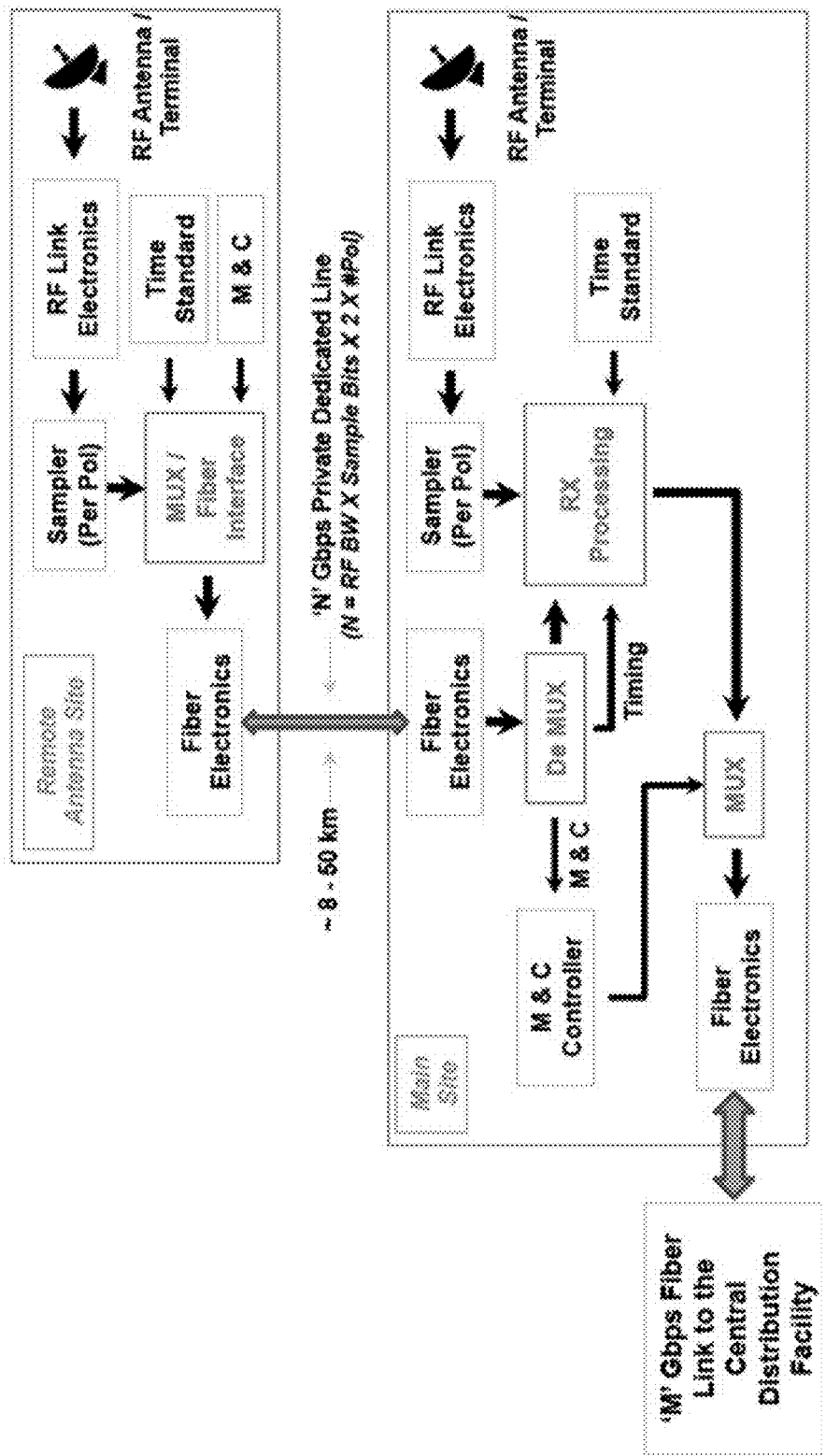
FIG. 14 is a schematic illustrating an example MIMO ground station with a receiver.

FIG. 14 is a schematic illustrating an example MIMO ground station with a receiver. In order to create a high rank Line of Sight MIMO channel matrix, the ground station MIMO antennas may need to be separated by 8-50 kms. All the sampled signals from the multiple ground antenna sites need to be brought to a central location for MIMO receiver processing. In this particular embodiment, sampled baseband signals from remote sites are packetized and sent over a dedicated optical fiber backbone to the main site to be processed along with all the other signals received at the various MIMO antennas. The MIMO receiver processing is done at the main site. The separated data streams are then sent to the central data distribution facility.

Table 8 summarizes and compares the quantity and diameter of flight transmitters and receiver antenna diameters as well as the quantity and diameter of ground antennas for the cases of SISO and MIMO, at different communications frequencies.

TABLE 8

Quantity, flight and ground aperture diameters for cases of SISO and MIMO at different frequency bands.

| Architecture (multi-sites for all) | Flight Transceiver | Ground Station (Gateway) |
|---|---|---|
| SISO ($K_a$, V, or E-Band) | One 3m Tx antenna ($K_a$, V, or E) One 2.5m Rx antenna ($K_a$, V, or E) | One Tx/Rx 12m antenna 15 ground stations |
| SISO (Q/V + E-band) | Two 3m Tx antennas (1 V and 1 E) Two 2.5m Rx antennas (1 V and 1 E) | One, 12m E-band Tx/Rx antenna One 12m V-band Tx/Rx antenna 7 ground stations |
| 2 × 2 MIMO | Four 2m Tx antenna 6m spacing between antennas | Two 12m antennas 9 ground stations |
| 3 × 3 MIMO | Six 2m Tx antenna 6m spacing between antennas | Three 12m antennas 6 ground stations |

Tx denotes transmit and
Rx denotes receive.
Tx denotes transmitter and
Rx denotes receiver.

Particular embodiments may provide channelization on uplink. Particular embodiments may further provide implementation of cross-polarization interference cancellation or other types of interference cancellation on the satellite. Particular embodiments may further provide oval satellite antennas, which may widen the beam in the direction of spacing of the MIMO ground stations, as well as mitigating pointing error.

Three example system configurations are discussed below:

Example 1 user beams: $K_a$-band dual-polarized ground stations: V-band dual-polarized uplink; Q-band single-polarized downlink spectrum/ground station: 8 GHz forward channel, 3 GHz return channel Example 2 user beams: $K_a$ dual-polarized ground stations: V- and E-band (81-86 GHz) dual-polarized uplink; Q-band dual-polarized downlink spectrum/ground station: 18 GHz forward channel, 6 GHz return channel Example 3 user beams: $K_a$ dual-polarized ground stations: V- and E-band (71-76 GHz, 81-86 GHz) dual-polarized uplink; Q-band dual-polarized downlink spectrum/ground station: 27 GHz forward channel, 6 GHz return channel

TABLE 7

Summary of frequencies for three satellite transceiver designs.

| | Ground Stations | | User Beams | |
|---|---|---|---|---|
| | Forward U/L (GHz) | Return D/L (GHz) | Forward U/L (GHz) | Return D/L (GHz) |
| Example 1 | 47.2-50.2 & 50.4-51.4 | 37.5-40.5 * | 17.8-18.8 & 19.7-20.2 | 29.5-30.0 |
| Example 2 | 47.2-50.2 & 50.4-51.4, 81-86 | 37.5-40.5 ** | 17.8-18.8 & 19.7-20.2 | 29.5-30.0 |
| Example 3 | 47.2-50.2 & 50.4-51.4, 71-76, 81-86 | 37.5-40.5 ** | 17.8-18.8 & 19.7-20.2 | 29.5-30.0 |

Figure 15A:
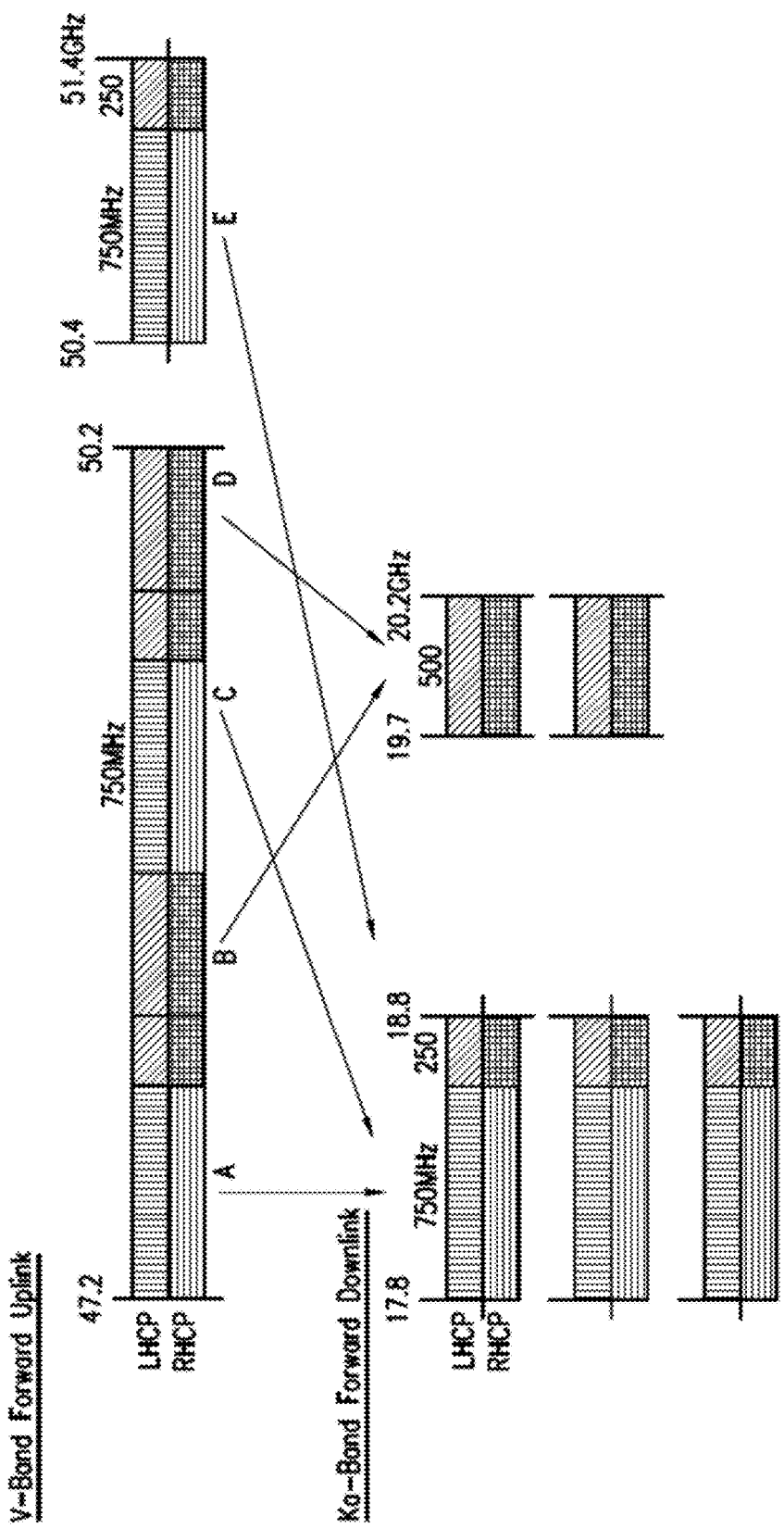
FIG. 15A illustrates a forward channel frequency plan according to a first example embodiment of a system configuration described herein.

FIG. 15A illustrates a forward channel frequency plan according to a first example embodiment ("Example 1") of a system configuration described herein. The V/$K_a$-Band forward frequency plan illustrated in FIG. 15A may support 12 user beams by each ground station, thereby requiring 30 ground stations per satellite transceiver. As shown, ten of the user beams may be assigned 750 MHz and two of the user beams may be assigned 250 MHz, thereby requiring five local oscillator (LO) frequencies.

Figure 15B:
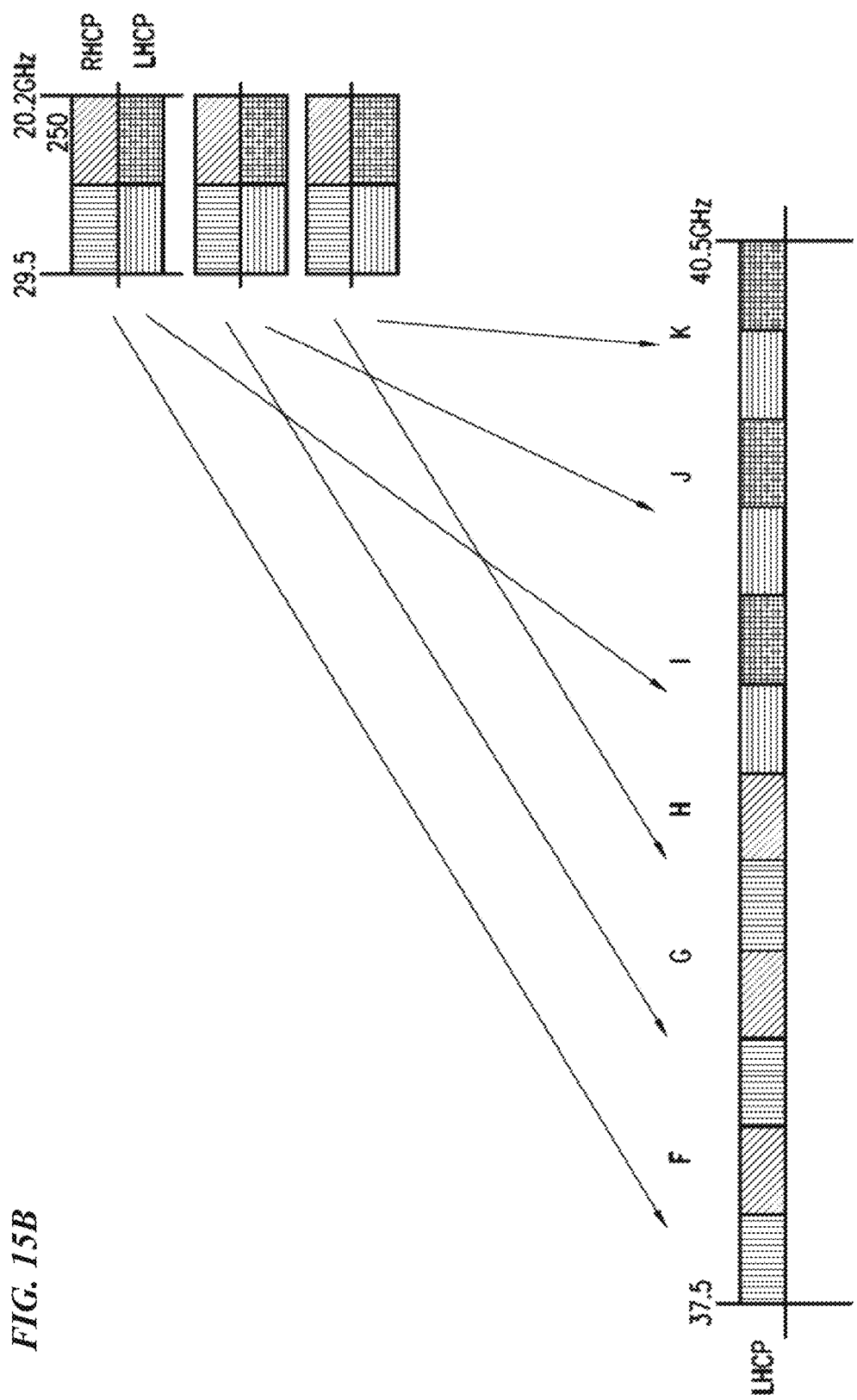
FIG. 15B illustrates a return channel frequency plan according to the example embodiment of FIG. 15A.

FIG. 15B illustrates a return channel frequency plan according to the example embodiment of FIG. 15A. As described above, 12 user beams may be supported by each ground station, and each of the beams assigned to a ground station for the forward channel may be assigned to the same gateway for the return channel. On the return channel, all 12 user beams may be assigned 250 MHz, thereby requiring six LO frequencies.

Figure 15C:
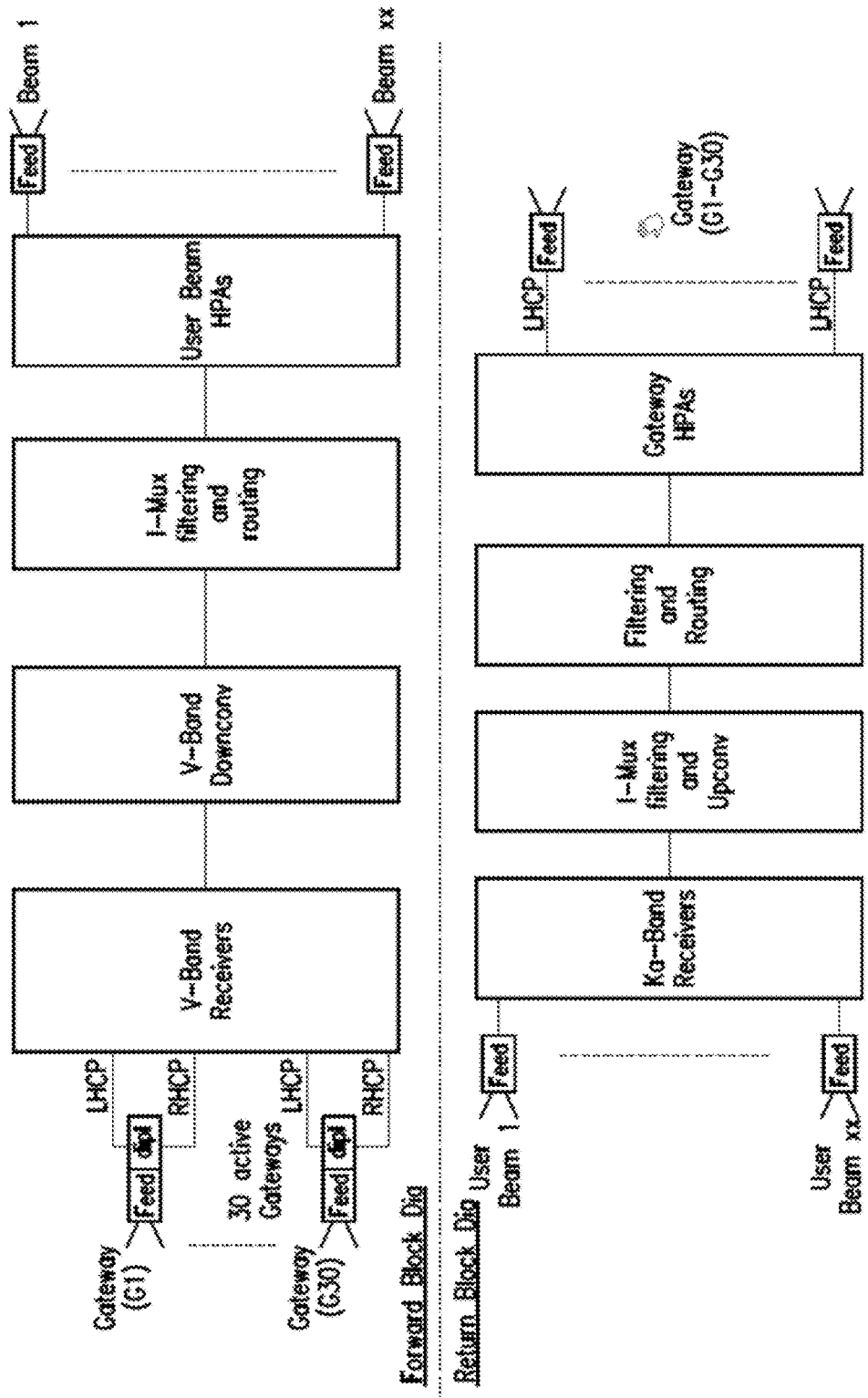
FIG. 15C is a schematic illustrating forward/return payload block diagram according to the example embodiment of FIG. 15A.

FIG. 15C is a schematic illustrating forward/return payload block diagram according to the example embodiment of FIG. 15A. In the forward channel block diagram, V-band signals received from the ground stations are processed (e.g., down-converted, then filtered and routed) to generate individual $K_a$ user beams to transmit information to end users' devices. In the return channel block diagram, the $K_a$ user beams received from end users' devices are processed (e.g., filtered and routed, then up-converted) to generate Q-band signals to transmit information back to the ground stations.

Figure 16A:
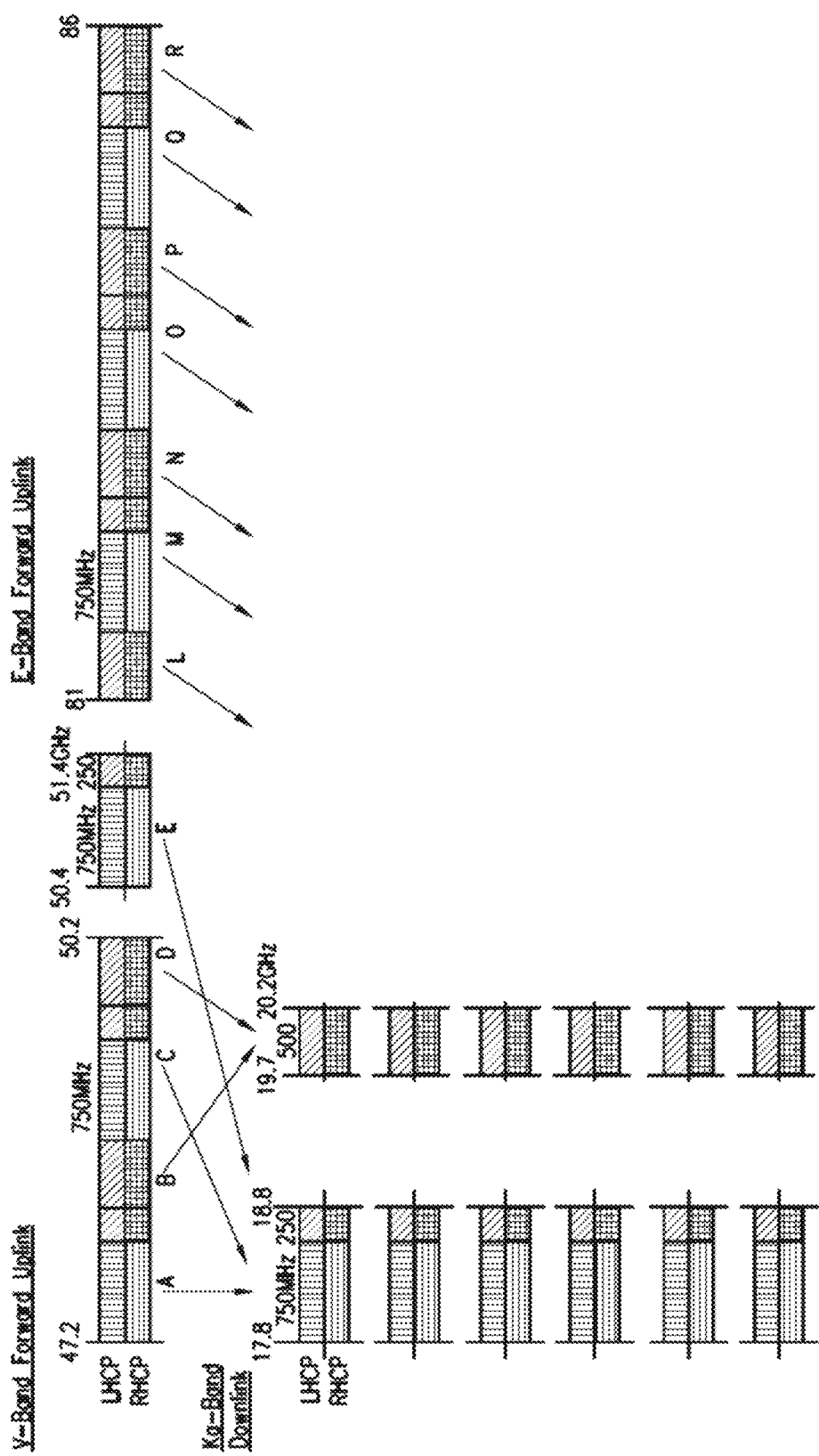
FIG. 16A illustrates a forward channel frequency plan according to a second example embodiment of a system configuration described herein.

FIG. 16A illustrates a forward channel frequency plan according to a second example embodiment ("Example 2")

Particular embodiments may provide channelization on uplink. Particular embodiments may further provide implementation of cross-polarization interference cancellation or other types of interference cancellation on the satellite. Particular embodiments may further provide oval satellite antennas, which may widen the beam in the direction of spacing of the MIMO ground stations, as well as mitigating pointing error.

Three example system configurations are discussed below: of a system configuration described herein. The V-Band+E-Band (at 81-86 GHz) forward frequency plan illustrated in FIG. 16A may provide 10 GHz of additional forward uplink bandwidth for each gateway. This example configuration may support 24 user beams by each ground station, thereby requiring only 15 ground stations per satellite transceiver. In this example configuration, any user beams previously assigned 250 MHz may be assigned 750 MHz, thereby requiring 12 LO frequencies.

Figure 16B:
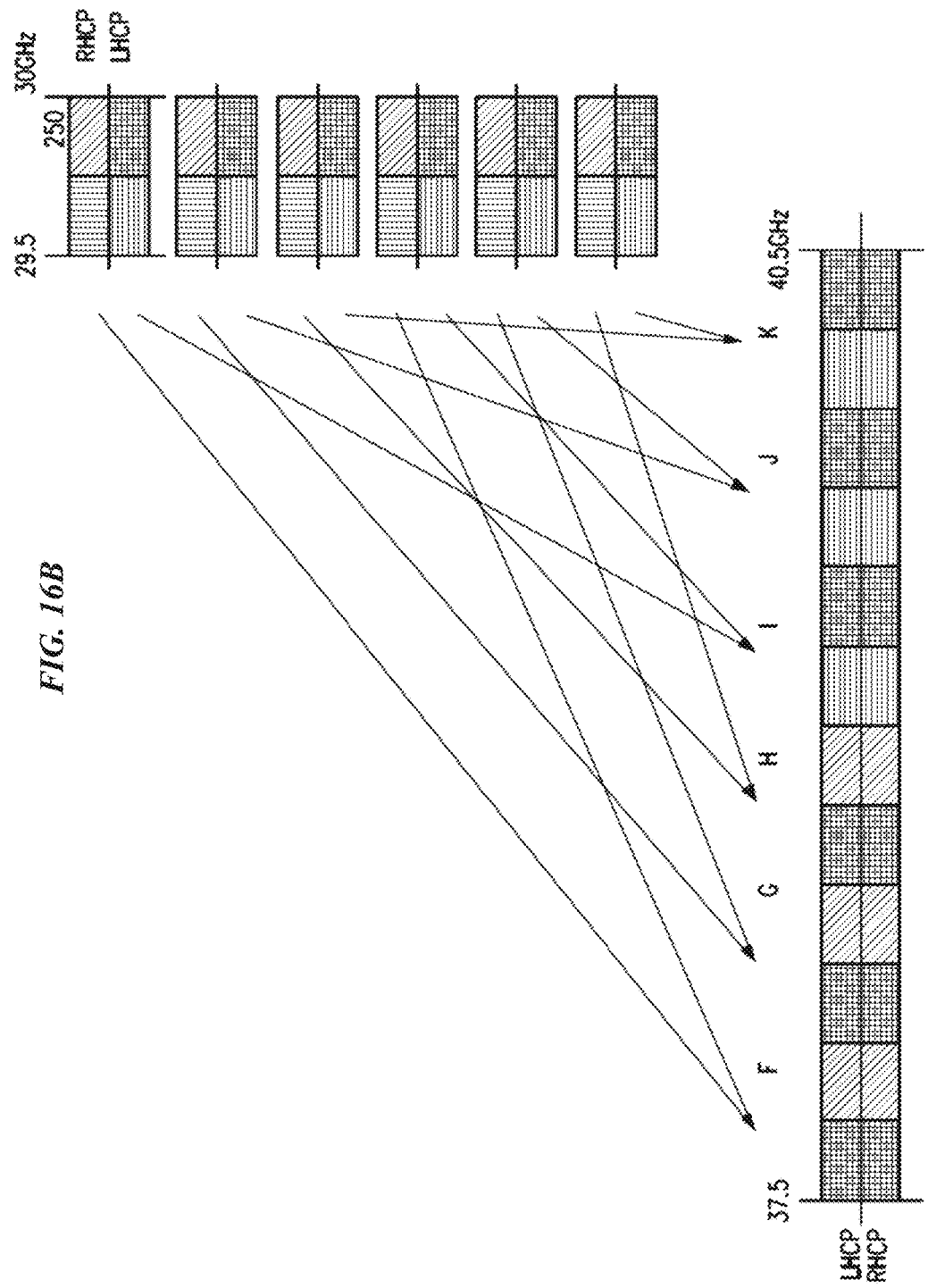
FIG. 16B illustrates a return channel frequency plan according to the example embodiment of FIG. 16A.

FIG. 16B illustrates a return channel frequency plan according to the example embodiment of FIG. 16A. As described above, 24 user beams may be supported by each ground station, and each of the beams assigned to a ground station for the forward channel may be assigned to the same gateway for the return channel. On the return channel, all 24 user beams may be assigned 250 MHz (providing a 3:1 forward to return bandwidth ratio), requiring six LO frequencies. In this example, both polarizations may be used for the return transmission. In this embodiment, no additional return traveling-wave tube amplifiers (TWTAs) may be required (as compared to Example 1).

Figure 16C:
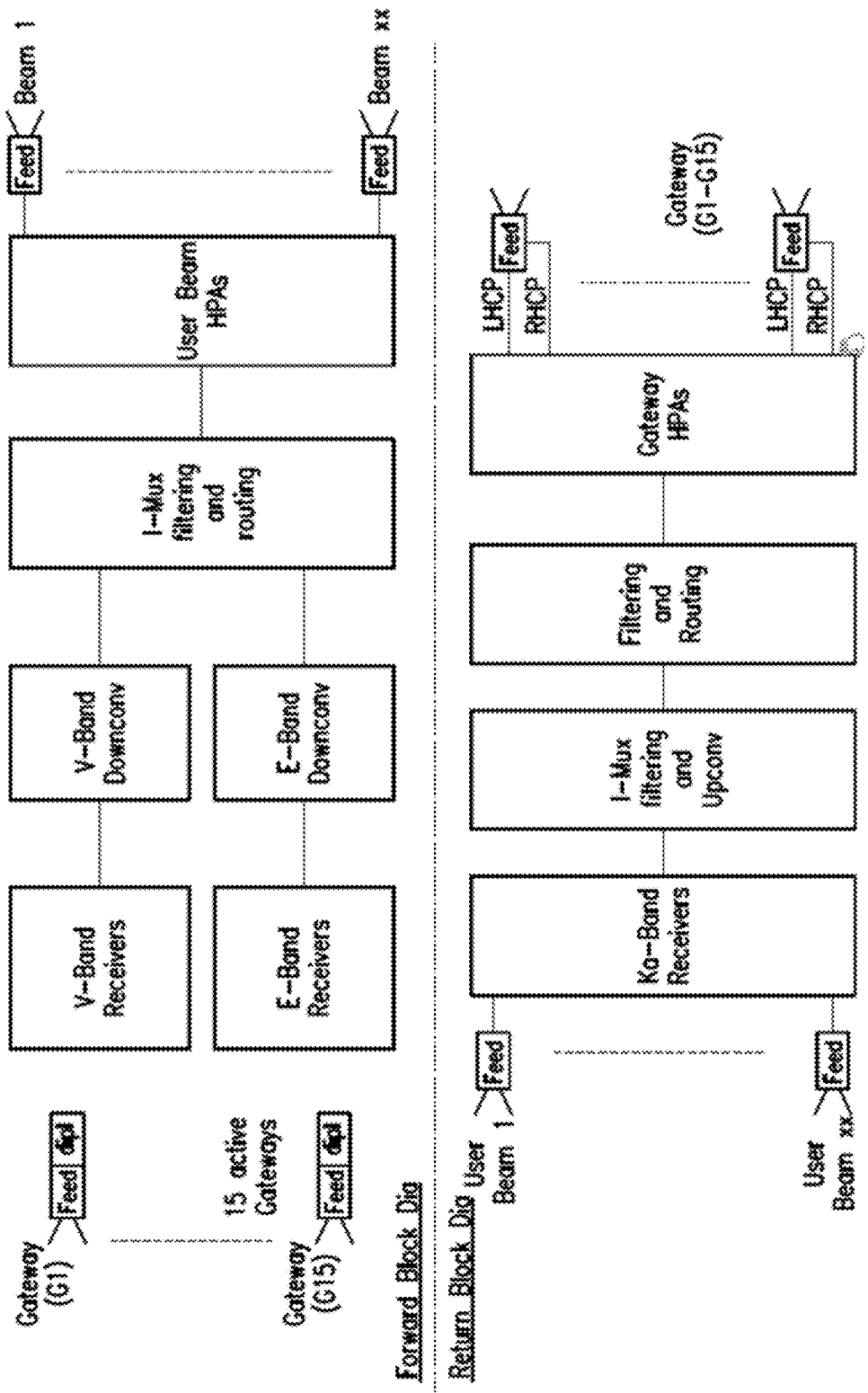
FIG. 16C is a schematic illustrating forward/return payload block diagram according to the example embodiment of FIG. 16A.
Figure 17A:
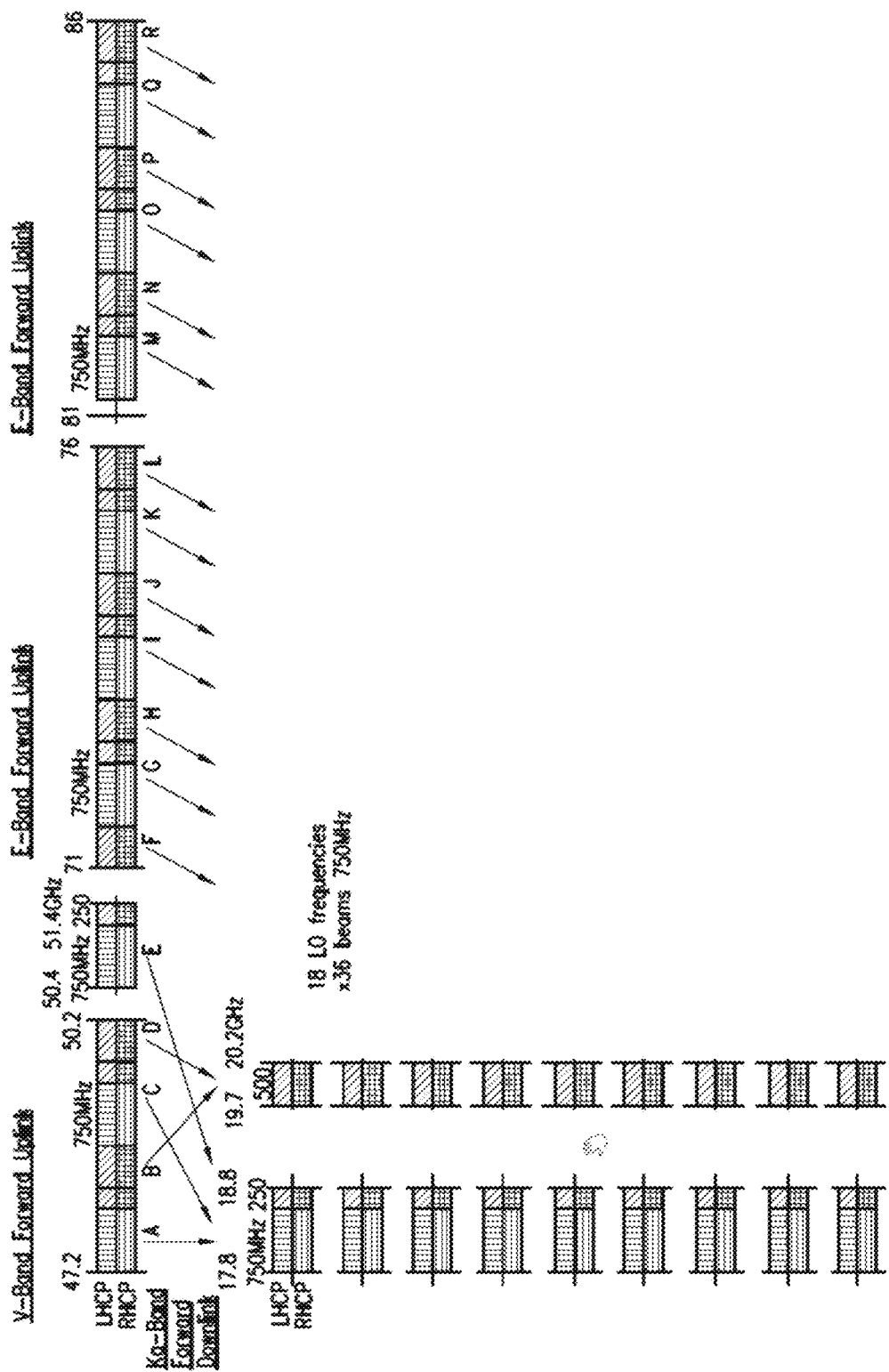
FIG. 17A illustrates a forward channel frequency plan according to a third example embodiment of a system configuration described herein.

FIG. 16C is a schematic illustrating forward/return payload block diagram according to the example embodiment of FIG. 16A. In the forward block diagram, V-band and E-band signals received from the ground stations are processed (e.g., separately down-converted, then jointly filtered and routed) to generate individual $K_a$ user beams to transmit information to end users' devices. In the return block diagram, the $K_a$ user beams received from end users' devices are processed (e.g., filtered and routed, then up-converted) to generate Q-band signals to transmit information back to the ground stations FIG. 17A illustrates a forward channel frequency plan according to a third example embodiment ("Example 3") of a system configuration described herein. The V-Band+E-Band (in the 71-76 GHz and 81-86 GHz bandwidths) forward frequency plan illustrated in FIG. 16A may provide 20 GHz of additional forward uplink bandwidth for each gateway (relative to Example 1). This example configuration may support 36 user beams by each ground station, thereby requiring only 10 ground stations per satellite transceiver. In this example configuration, all user beams may be assigned 750 MHz, thereby requiring 18 LO frequencies (the forward bandwidth assignments for each beam may be comparable to Example 2).

Figure 17B:
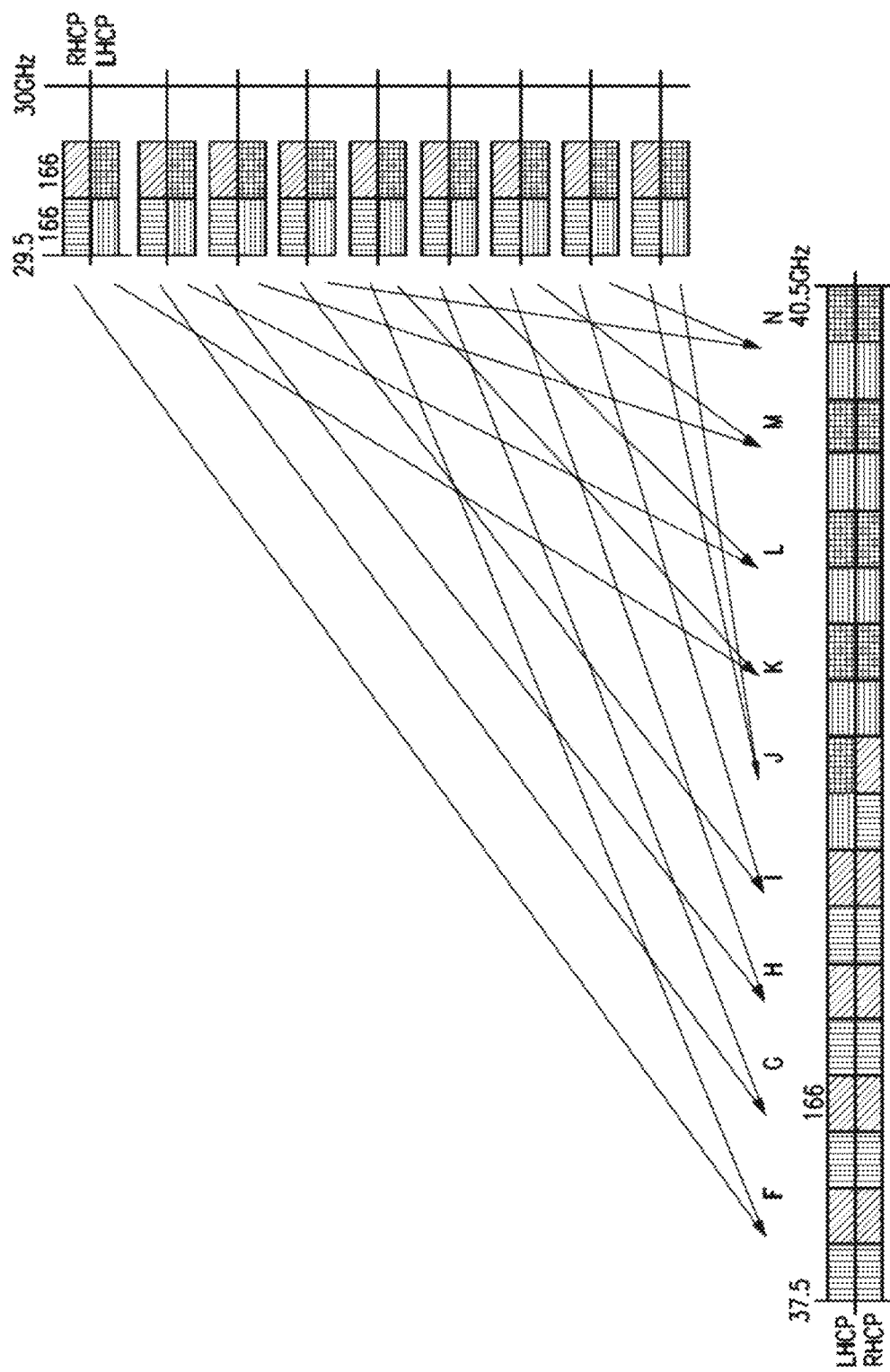
FIG. 17B illustrates a return channel frequency plan according to the example embodiment of FIG. 17A.

FIG. 17B illustrates a return channel frequency plan according to the example embodiment of FIG. 17A. As described above, 36 user beams may be supported by each ground station, and each of the beams assigned to a ground station for the forward channel may be assigned to the same gateway for the return channel. On the return channel, all 36 user beams may be assigned 166 MHz (providing a 4.5:1 forward to return bandwidth ratio), requiring nine LO frequencies (as compared to six LO frequencies for Examples 1 and 2). In this example, both polarizations may be used for the return transmission. In this embodiment, no additional return traveling-wave tube amplifiers (TWTAs) may be required (as compared to Example 1).

When comparing mass and power requirements, the embodiments described above with respect to the three examples illustrates various possible benefits of each system configuration (as shown in Table 8 below). In Example 2 (relative to Example 1), the additional forward uplink bandwidth for Example 2 may reduce the number of ground stations by 50%. The additional mass and DC power required for the E-band components may be offset by a reduction of V-band units required. The slight increase in mass for Example 2 accounts for the additional LOs for the E-band frequency translation. In Example 3 (relative to Example 1), the significant reduction in mass and power is attributable to the reduction in the number of required ground stations.

TABLE 8

Comparison of mass and power requirements.

| | Mass (kg) | Power (W) |
| --- | --- | --- |
| Example 1 | 2013 | 20381 |
| Example 2 | 2017 | 20034 |
| Example 3 | 1872 | 19474 |

In order to assess the number of diversity gateways required for a given system configuration, particular embodiments may use a N+P gateway redundancy approach to determine the minimum number of gateways required such that at least X of them are simultaneously available 99.9 percent of the time (overall 99.9 percent gateway link availability), where X is the number of ground stations in a given system configuration. As described above in the three examples illustrated in FIGS. 15A-17B, X is 30 for Example 1, 15 for Example 2, and 10 for Example 3. Particular embodiments may use a binomial distribution for N+P, where N is {30, 15, 10} gateways, and P is in the range of 1-5 extra gateways. Based on the following assumptions:
  each gateway has the same gateway outage probability p,
  the gateway capacity delivered is either 1 or 0, and
  there is no correlation of outage between gateways,
the aggregate probability of gateway outage, P_outage may be calculated as:

$$p\_outage = \sum_{i=0}^{N} \frac{i}{N} C_{N+P}^{P+i} * \rho^{P+i} (1-\rho)^{N-i}$$

where:
  N=# of baseline gateways,
  P=# of diversity gateways provisioned, $P$=probability of outage of each gateway, and
C=binomial coefficient.

Figure 18A:
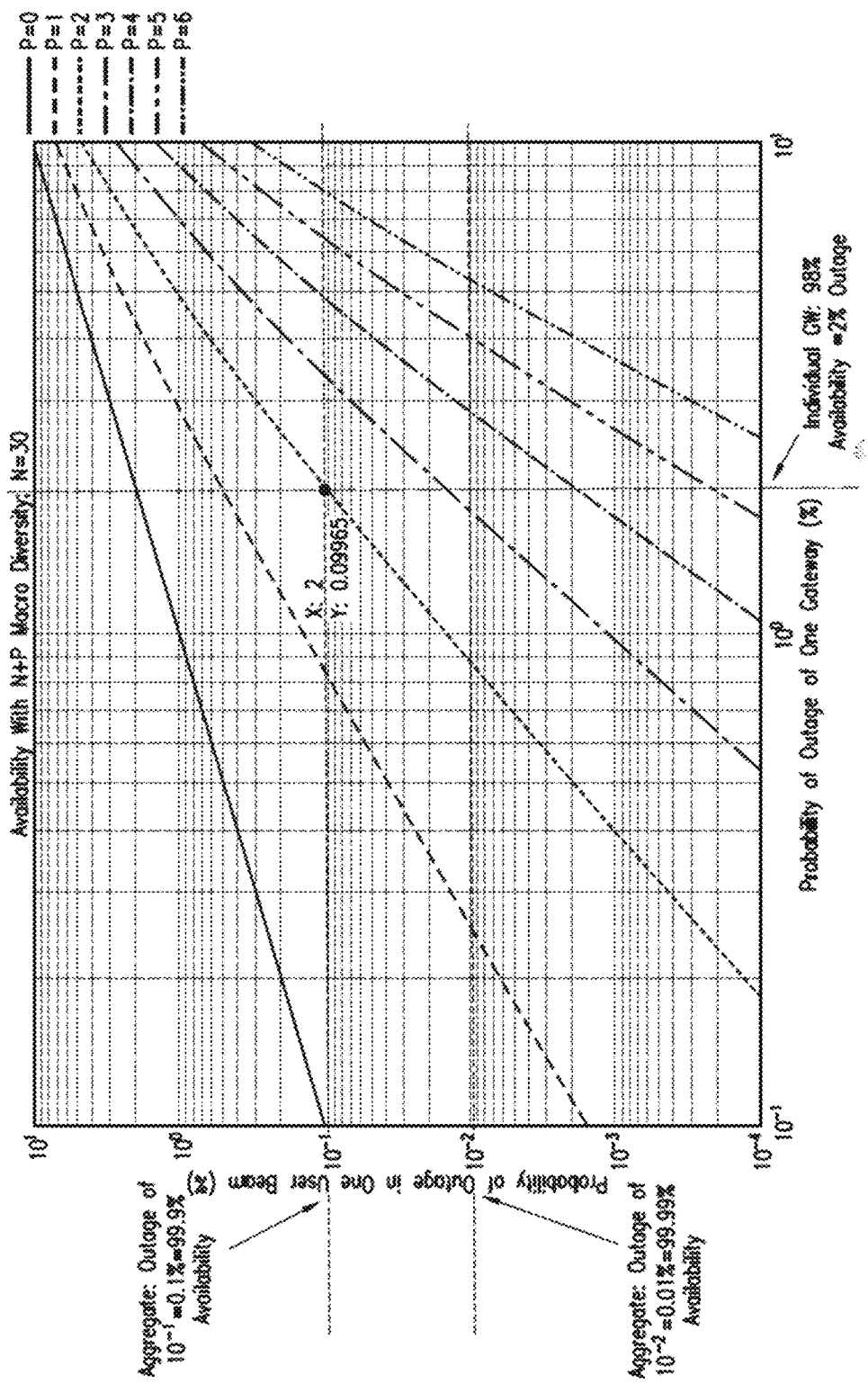
FIGS. 18A-C are charts illustrating results of calculating a recommended number of diversity gateways for the example embodiments described with respect to FIGS. 15A-17B.
Figure 18B:
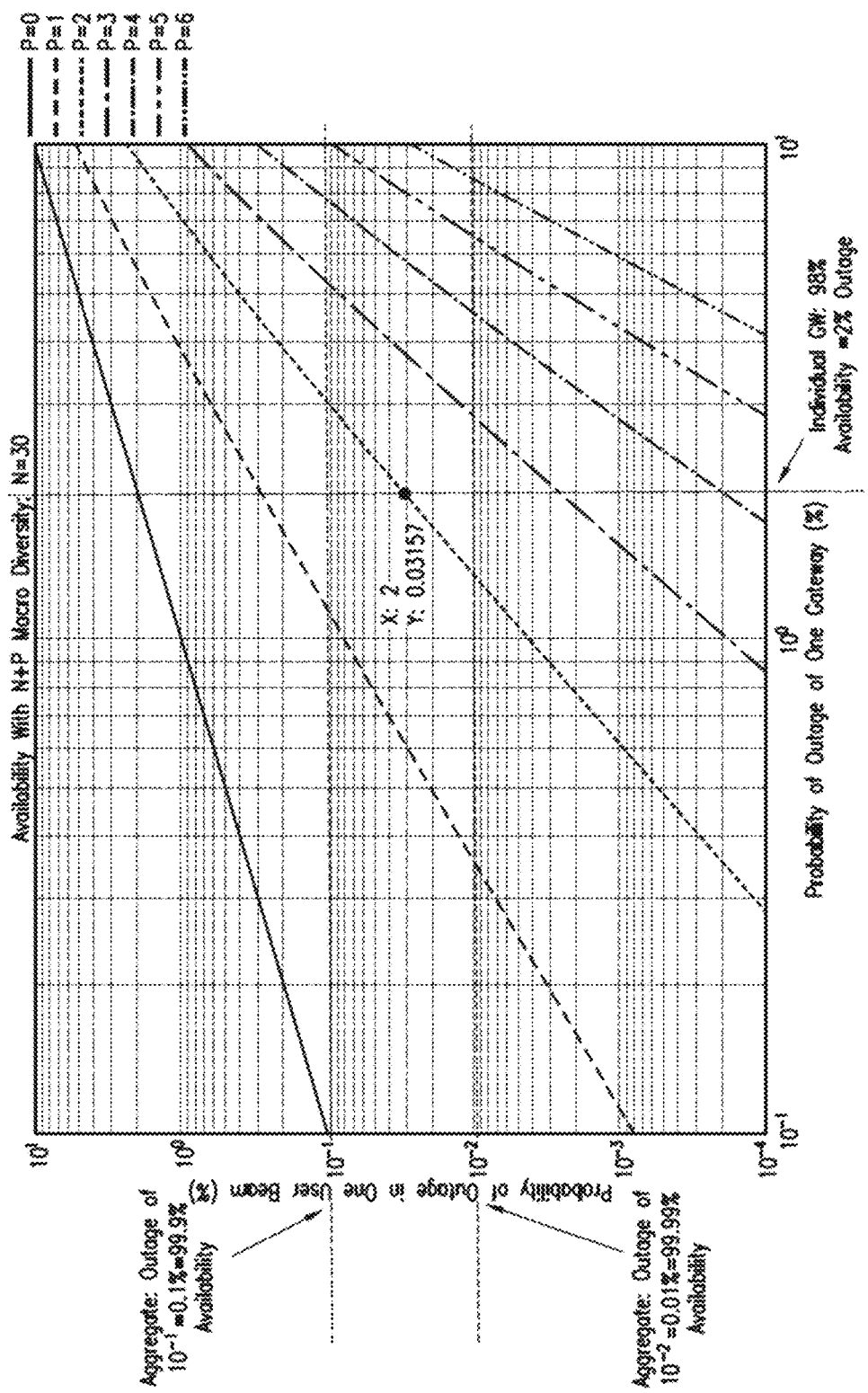
Figure 18C:
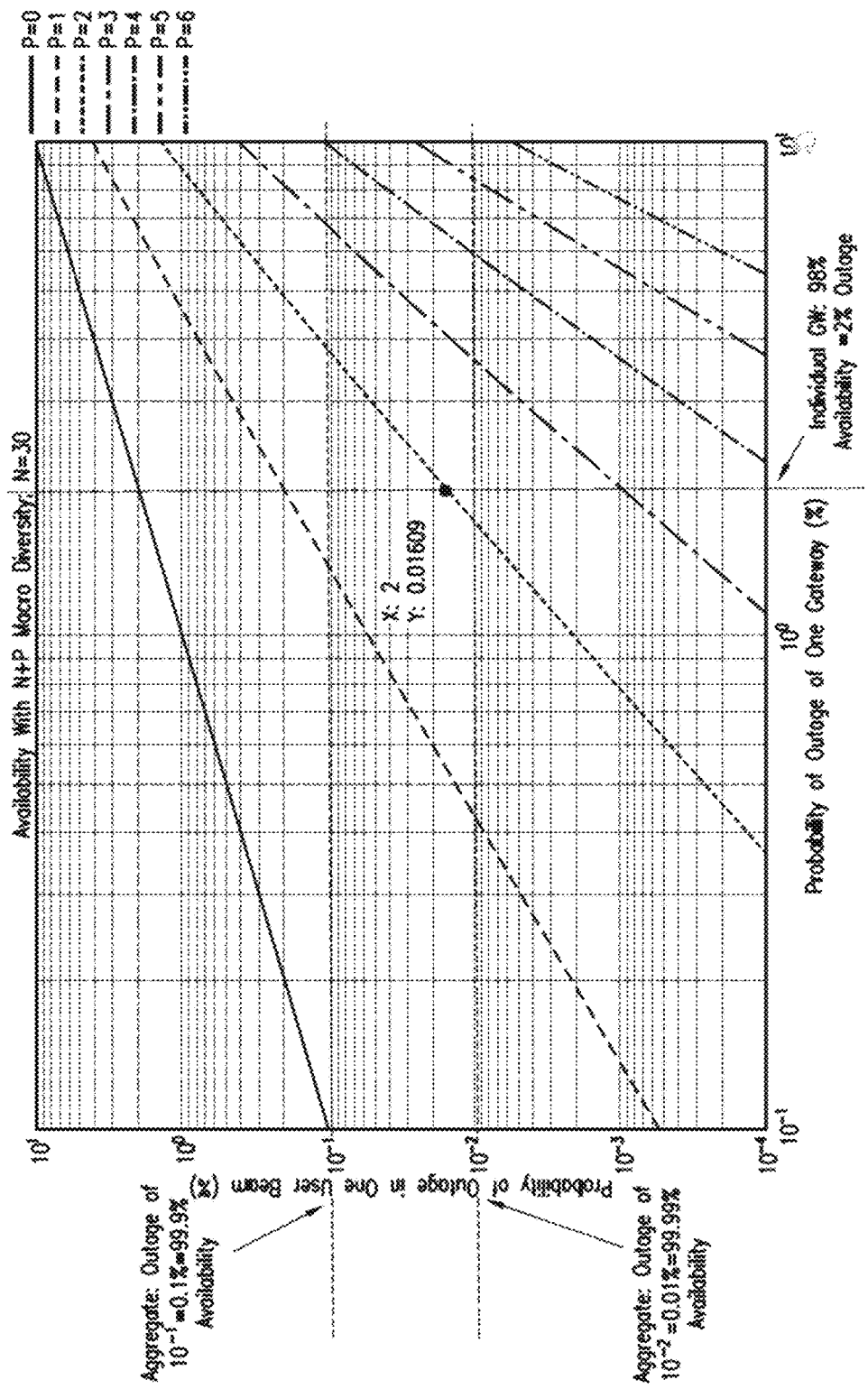

FIG. 18A is a chart illustrating results of calculating a recommended number of diversity gateways for the example embodiment described with respect to Example 1 (forward channel: V-band uplink/$K_a$-band downlink; return channel: $K_a$ uplink/Q-band downlink), based on varying the number of diversity gateways provisioned for the system configuration with 30 ground stations (12 user beams/gateway). FIG. 18B is a chart illustrating results of calculating a recommended number of diversity gateways for the example embodiment described with respect to Example 2 (forward channel: V-band+E-band [81-86 GHz] uplink/$K_a$-band downlink; return channel: $K_a$ uplink/Q-band downlink), based on varying the number of diversity gateways provisioned for the system configuration with 15 ground stations (24 user beams/gateway). FIG. 18C is a chart illustrating results of calculating a recommended number of diversity gateways for the example embodiment described with respect to Example 3 (forward channel: V-band+E-band [71-76 GHz and 81-86 GHz] uplink/$K_a$-band downlink; return channel: $K_a$ uplink/Q-band downlink), based on varying the number of diversity gateways provisioned for the system configuration with 10 ground stations (36 user beams/gateway). In all three instances, $P$ is assumed to be 2%, corresponding to 98% availability for each individual gateway.

As illustrated in FIGS. 18A-C and in Table 9 below, in each of the three examples, provisioning two diversity gateways may be required for the three examples described above.

TABLE 9

Results of assessing number of required diversity gateways.

| | Example 1 | Example 2 | Example 3 |
|---|---|---|---|
| Primary Ground Stations | 30 | 15 | 10 |
| Diversity Gateways | 2 | 2 | 2 |
| Overall Gateway Availability | 99.90% | 99.96% | 99.98% |

As used within this disclosure, the term "ground station" may be used interchangeably with the term "gateway."

Figure 19:
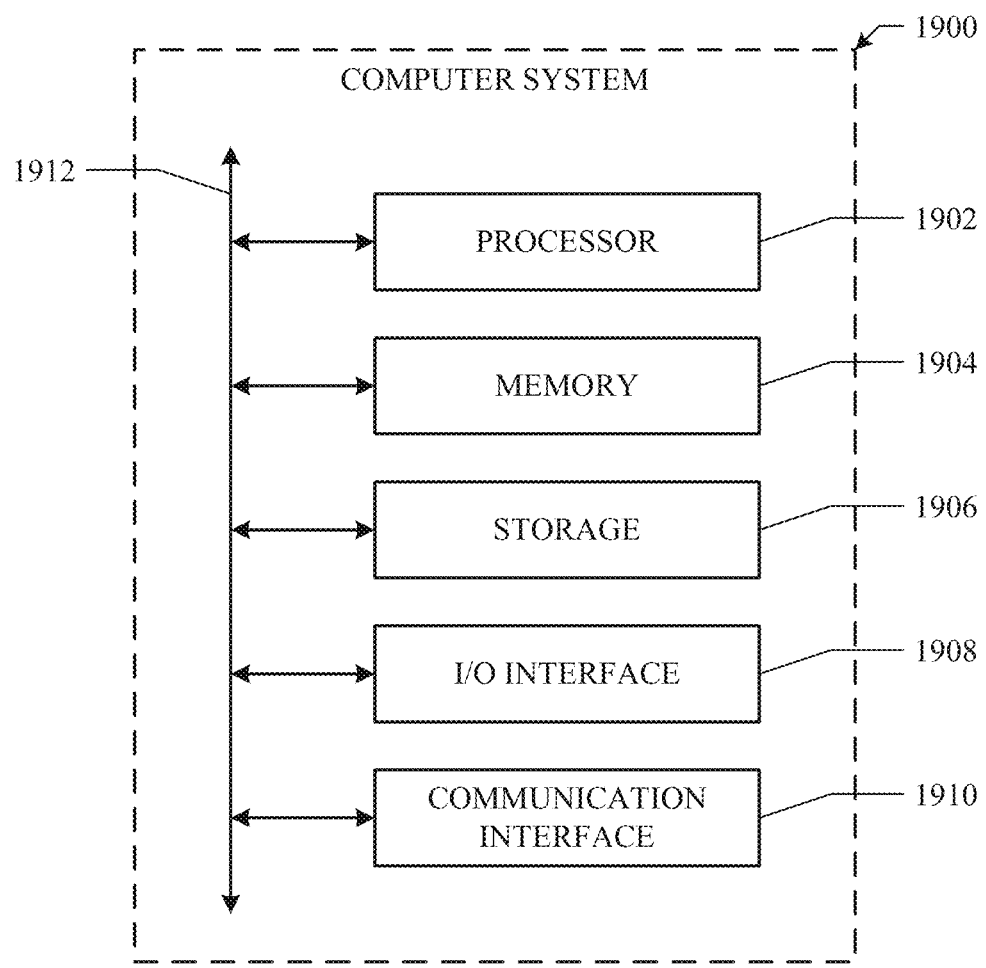
FIG. 19 illustrates an example computer system.

FIG. 19 illustrates an example computer system 1900. In particular embodiments, one or more computer systems 1900 perform one or more steps of one or more methods described or illustrated herein. In particular embodiments, one or more computer systems 1900 provide functionality described or illustrated herein. In particular embodiments, software running on one or more computer systems 1900 performs one or more steps of one or more methods described or illustrated herein or provides functionality described or illustrated herein. Particular embodiments include one or more portions of one or more computer systems 1900. Herein, reference to a computer system may encompass a computing device, and vice versa, where appropriate. Moreover, reference to a computer system may encompass one or more computer systems, where appropriate.

This disclosure contemplates any suitable number of computer systems 1900. This disclosure contemplates computer system 1900 taking any suitable physical form. As example and not by way of limitation, computer system 1900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1900 may include one or more computer systems 1900; be unitary or distributed; span multiple locations; span multiple machines; span multiple data centers; or reside in a cloud, which may include one or more cloud components in one or more networks. Where appropriate, one or more computer systems 1900 may perform without substantial spatial or temporal limitation one or more steps of one or more methods described or illustrated herein. As an example, and not by way of limitation, one or more computer systems 1900 may perform in real time or in batch mode one or more steps of one or more methods described or illustrated herein. One or more computer systems 1900 may perform at different times or at different locations one or more steps of one or more methods described or illustrated herein, where appropriate.

In particular embodiments, computer system 1900 includes a processor 1902, memory 1904, storage 1906, an input/output (I/O) interface 1908, a communication interface 1910, and a bus 1912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1902 includes hardware for executing instructions, such as those making up a computer program. As an example, and not by way of limitation, to execute instructions, processor 1902 may retrieve (or fetch) the instructions from an internal register, an internal cache, memory 1904, or storage 1906; decode and execute them; and then write one or more results to an internal register, an internal cache, memory 1904, or storage 1906. In particular embodiments, processor 1902 may include one or more internal caches for data, instructions, or addresses. This disclosure contemplates processor 1902 including any suitable number of any suitable internal caches, where appropriate. As an example, and not by way of limitation, processor 1902 may include one or more instruction caches, one or more data caches, and one or more translation lookaside buffers (TLBs). Instructions in the instruction caches may be copies of instructions in memory 1904 or storage 1906, and the instruction caches may speed up retrieval of those instructions by processor 1902. Data in the data caches may be copies of data in memory 1904 or storage 1906 for instructions executing at processor 1902 to operate on; the results of previous instructions executed at processor 1902 for access by subsequent instructions executing at processor 1902 or for writing to memory 1904 or storage 1906; or other suitable data. The data caches may speed up read or write operations by processor 1902. The TLBs may speed up virtual-address translation for processor 1902. In particular embodiments, processor 1902 may include one or more internal registers for data, instructions, or addresses. This disclosure contemplates processor 1902 including any suitable number of any suitable internal registers, where appropriate. Where appropriate, processor 1902 may include one or more arithmetic logic units (ALUs); be a multi-core processor; or include one or more processors 1902. Although this disclosure describes and illustrates a particular processor, this disclosure contemplates any suitable processor.

In particular embodiments, memory 1904 includes main memory for storing instructions for processor 1902 to execute or data for processor 1902 to operate on. As an example, and not by way of limitation, computer system 1900 may load instructions from storage 1906 or another source (such as, for example, another computer system 1900) to memory 1904. Processor 1902 may then load the instructions from memory 1904 to an internal register or internal cache. To execute the instructions, processor 1902 may retrieve the instructions from the internal register or internal cache and decode them. During or after execution of the instructions, processor 1902 may write one or more results (which may be intermediate or final results) to the internal register or internal cache. Processor 1902 may then write one or more of those results to memory 1904. In particular embodiments, processor 1902 executes only instructions in one or more internal registers or internal caches or in memory 1904 (as opposed to storage 1906 or elsewhere) and operates only on data in one or more internal registers or internal caches or in memory 1904 (as opposed to storage 1906 or elsewhere). One or more memory buses (which may each include an address bus and a data bus) may couple processor 1902 to memory 1904. Bus 1912 may include one or more memory buses, as described below. In particular embodiments, one or more memory management units (MMUs) reside between processor 1902 and memory 1904 and facilitate accesses to memory 1904 requested by processor 1902. In particular embodiments, memory 1904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1904 may include one or more memories 1904, where appropriate. Although this disclosure describes and illustrates particular memory, this disclosure contemplates any suitable memory.

In particular embodiments, storage 1906 includes mass storage for data or instructions. As an example, and not by way of limitation, storage 1906 may include a hard disk drive (HDD), a floppy disk drive, flash memory, an optical disc, a magneto-optical disc, magnetic tape, or a Universal Serial Bus (USB) drive or a combination of two or more of these. Storage 1906 may include removable or non-removable (or fixed) media, where appropriate. Storage 1906 may be internal or external to computer system 1900, where appropriate. In particular embodiments, storage 1906 is non-volatile, solid-state memory. In particular embodiments, storage 1906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1906 taking any suitable physical form. Storage 1906 may include one or more storage control units facilitating communication between processor 1902 and storage 1906, where appropriate. Where appropriate, storage 1906 may include one or more storages 1906. Although this disclosure describes and illustrates particular storage, this disclosure contemplates any suitable storage.

In particular embodiments, I/O interface 1908 includes hardware, software, or both, providing one or more interfaces for communication between computer system 1900 and one or more I/O devices. Computer system 1900 may include one or more of these I/O devices, where appropriate. One or more of these I/O devices may enable communication between a person and computer system 1900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1908 for them. Where appropriate, I/O interface 1908 may include one or more device or software drivers enabling processor 1902 to drive one or more of these I/O devices. I/O interface 1908 may include one or more I/O interfaces 1908, where appropriate. Although this disclosure describes and illustrates a particular I/O interface, this disclosure contemplates any suitable I/O interface.

In particular embodiments, communication interface 1910 includes hardware, software, or both providing one or more interfaces for communication (such as, for example, packet-based communication) between computer system 1900 and one or more other computer systems 1900 or one or more networks. As an example, and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1910 for it. As an example, and not by way of limitation, computer system 1900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1900 may include any suitable communication interface 1910 for any of these networks, where appropriate. Communication interface 1910 may include one or more communication interfaces 1910, where appropriate. Although this disclosure describes and illustrates a particular communication interface, this disclosure contemplates any suitable communication interface.

In particular embodiments, bus 1912 includes hardware, software, or both coupling components of computer system 1200 to each other. As an example and not by way of limitation, bus 1912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1912 may include one or more buses 1912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A transceiver in geosynchronous orbit comprising:
a plurality of forward channel receivers, wherein at least one of the forward channel receivers receives (1) a forward channel laser communication beam transmitted from a ground station and (2) an E-band frequency having a bandwidth of 81-86 GHz;
a plurality of forward channel transmitters having different frequencies, wherein the forward channel transmitters transmit user beams to endpoint devices, wherein the user beams are derived from the forward channel laser and MMW communication beams;
a plurality of return channel receivers, wherein the return channel receivers receive user beams from the endpoint devices; and
at least one return channel transmitter, wherein the return channel transmitter transmits a return channel laser communication beam to a ground station.

2. The transceiver of claim 1, further comprising one or more processors and a memory coupled to the processors comprising instructions executable by the processors, the processors being operable when executing the instructions to:
receive forward channel data transmitted by one or more uplink beams received at the forward channel receivers;
based on the forward channel data, generate a plurality of forward channel downlink signals, each of the forward channel downlink signals comprising at least a portion of the forward channel data; and
for each of the forward channel downlink signals, transmit the forward channel downlink signal to one of the forward channel transmitters.

3. The transceiver of claim 2, the processors being further operable when executing the instructions to:
receive return channel data transmitted by one or more uplink beams received at the return channel receivers;
based on the return channel data, generate a single return channel downlink signal comprising the return channel data; and
transmit the return channel downlink signal to the return channel transmitter.

4. The transceiver of claim 1, wherein an endpoint device comprises an end user client device, and wherein the user beams are RF signals impinging on laser communication beams.

5. The transceiver of claim 1, wherein an endpoint device comprises a network gateway device, and wherein the user beams transmitted by the forward channel transmitters are laser communication beams transmitted in addition to E-band frequency signal having a bandwidth of 71-76 GHz.

6. The transceiver of claim 1, wherein the return channel laser communication beam is transmitted in addition to a Q-band plus E-band frequency signal.

7. The transceiver of claim 1, wherein the return channel laser communication beam is dual-polarized.

8. The transceiver of claim 1, wherein the transceiver is located on a satellite in low-earth orbit or medium-earth orbit.

9. The transceiver of claim 1, wherein a single antenna feed receives signals comprising multiple types of MMW bands simultaneously.

10. The transceiver of claim 1, wherein each of the forward channel transmitters transmit signals using frequencies on the Q/V-band. V-band, W+E band, or W band.

11. A system comprising one or more processors and a memory coupled to the processors comprising instructions executable by the processors, the processors being operable when executing the instructions to:
receive forward channel data transmitted by one or more uplink beams received at a plurality of forward channel receivers communicably connected to the system, wherein at least one of the forward channel receivers receives (1) a forward channel laser communication beam transmitted from a ground station and (2) an E-band frequency having a bandwidth of 81-86 GHz;
based on the forward channel data, generate a plurality of forward channel downlink signals, each of the forward channel downlink signals comprising at least a portion of the forward channel data; and
for each of the forward channel downlink signals, transmit the forward channel downlink signal to one of a plurality of forward channel transmitters communicably connected to the system, wherein the forward channel transmitters transmit, using different frequencies, user beams to endpoint devices, wherein the user beams are derived from the forward channel laser and MMW communication beams.

12. The system of claim 11, the processors being further operable when executing the instructions to:
receive forward channel data transmitted by one or more uplink beams received at the forward channel receivers;
based on the forward channel data, generate a plurality of forward channel downlink signals, each of the forward channel downlink signals comprising at least a portion of the forward channel data; and
for each of the forward channel downlink signals, transmit the forward channel downlink signal to one of the forward channel transmitters.

13. The system of claim 12, the processors being further operable when executing the instructions to:
receive return channel data transmitted by one or more uplink beams received at a plurality of return channel receivers, wherein the return channel receivers receive user beams from the endpoint devices;
based on the return channel data, generate a single return channel downlink signal comprising the return channel data; and
transmit the return channel downlink signal to a return channel transmitter, wherein the return channel transmitter transmits a return channel laser communication beam to a ground station.

14. The system of claim 11, wherein an endpoint device comprises an end user client device, and wherein the user beams are RF signals impinging on laser communication beams.

15. The system of claim 11, wherein an endpoint device comprises a network gateway device, and wherein the user beams transmitted by the forward channel transmitters are laser communication beams transmitted in addition to E-band frequency signal having a bandwidth of 71-76 GHz.

16. The system of claim 11, wherein the return channel laser communication beam is transmitted in addition to a Q-band plus E-band frequency signal.

17. The system of claim 11, wherein the return channel laser communication beam is dual-polarized.

18. The system of claim 11, wherein the transceiver is located on a satellite in low-earth orbit or medium-earth orbit.

19. The system of claim 11, wherein a single antenna feed receives signals comprising multiple types of MMW bands simultaneously.

20. A method of transmitting signals by a transceiver in geosynchronous orbit comprising:
by a plurality of forward channel receivers, receiving forward channel data transmitted by one or more uplink beams, wherein at least one of the forward channel receivers receives (1) a forward channel laser communication beam transmitted from a ground station and (2) an E-band frequency having a bandwidth of 81-86 GHz;
by one or more processors of the transceiver and based on the forward channel data, generating a plurality of forward channel downlink signals, each of the forward channel downlink signals comprising at least a portion of the forward channel data;
by a plurality of forward channel transmitters having different frequencies, for each of the forward channel downlink signals, transmitting one or more user beams to one or more endpoint devices, wherein the user beams are derived from the forward channel laser and MMW communication beams;
by a plurality of return channel receivers, receiving return channel data transmitted by one or more uplink beams received at the return channel receivers, wherein the return channel receivers receive user beams from the endpoint devices;
by the one or more processors of the transceiver and based on the return channel data, generate a single return channel downlink signal comprising the return channel data; and
by at least one return channel transmitter, transmitting the return channel downlink signal to a ground station.

* * * * *